United States Patent [19]

Garland et al.

[11] Patent Number: 5,754,784
[45] Date of Patent: May 19, 1998

[54] MULTIMEDIA SYSTEM

[75] Inventors: J. David Garland, Berkeley Heights; Andrew R. McGee, South Plainfield, both of N.J.

[73] Assignee: AT&T Corp, Middletown, N.J.

[21] Appl. No.: 698,300

[22] Filed: Aug. 15, 1996

Related U.S. Application Data

[63] Continuation of Ser. No. 171,311, Dec. 21, 1993, abandoned.

[51] Int. Cl.⁶ .............. G06F 13/00; G06F 15/04; H04M 11/06
[52] U.S. Cl. .............. 395/200.49; 395/200.33; 345/335; 379/101.01
[58] Field of Search ............ 395/200.01, 200.02, 395/200.04, 200.05, 200.32, 200.33, 200.47, 200.48, 200.49, 200.34, 200.79; 345/335; 379/100.15, 101.01

[56] References Cited

U.S. PATENT DOCUMENTS

| | | | |
|---|---|---|---|
| 5,195,086 | 3/1993 | Baumgartner et al. | 370/62 |
| 5,208,745 | 5/1993 | Quentin et al. | 364/188 |
| 5,283,638 | 2/1994 | Engberg et al. | 348/14 |
| 5,289,461 | 2/1994 | de Nijs | 370/58.1 |
| 5,307,456 | 4/1994 | MacKay | 395/154 |
| 5,327,428 | 7/1994 | Van As et al. | 370/94.2 |
| 5,333,266 | 7/1994 | Boaz et al. | 395/200 |
| 5,333,299 | 7/1994 | Koval et al. | 395/550 |
| 5,347,632 | 9/1994 | Filepp et al. | 395/200 |
| 5,361,261 | 11/1994 | Edem et al. | 370/85.3 |
| 5,375,068 | 12/1994 | Palmer et al. | 364/514 C |
| 5,406,559 | 4/1995 | Edem et al. | 376/91 |
| 5,500,929 | 3/1996 | Dickinson | 395/160 |
| 5,534,914 | 7/1996 | Flohr et al. | 348/15 |
| 5,537,546 | 7/1996 | Sauter | 395/200.01 |
| 5,566,324 | 10/1996 | Kass | 395/487 |
| 5,594,911 | 1/1997 | Cruz et al. | 395/200.34 |
| 5,630,066 | 5/1997 | Gosling | 395/200.47 |

OTHER PUBLICATIONS

"Computer Dictionary 2nd Ed", Microsoft Press, 1994 p. 264.

*Primary Examiner*—Mark H. Rinehart
*Attorney, Agent, or Firm*—Thomas A. Restaino; Michele L. Conover

[57] ABSTRACT

The provisioning of a multimedia application is enhanced by using a communications protocol which defines a number of different functions and which allows a multimedia application to be segmented into a plurality of logical blocks such that a user may enter a request characterizing one such function and, in response thereto, the system performs the function with respect to a particular one of the logical blocks. The underlying multimedia system is also enhanced by arranging it so that an application provider may interact with the system via a telecommunications network for the purpose of, for example, storing the application thereon and/or "debugging" the stored application.

23 Claims, 23 Drawing Sheets

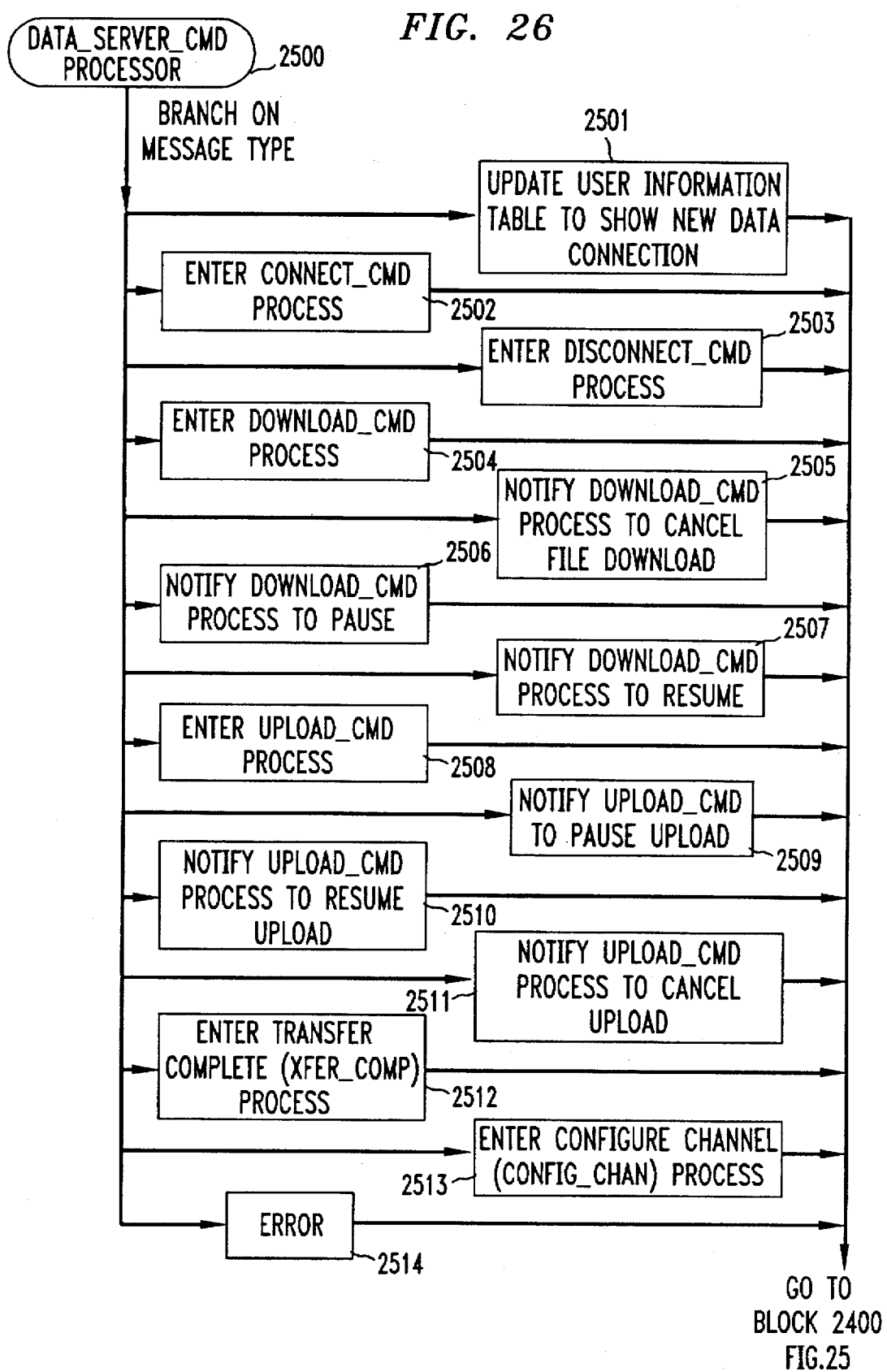

MULTIMEDIA SYSTEM

This application is a continuation of application Ser. No. 08/171,311, filed on Dec. 21, 1993, now abandoned.

TECHNICAL FIELD

The invention relates to a multimedia telecommunications system.

BACKGROUND OF THE INVENTION

A number of new services have been introduced as a result of the implementation of ISDN in the telecommunications network. One such service involves multimedia, the transmission of video (i.e., images) and corresponding voice signals. As a result of multimedia applications, a calling and called party may view and hear each other during a telephone conversation over an ISDN communications path. Multimedia includes other service applications that may be presented to a caller over the ISDN, for example, applications that entertain a caller such as motion video with accompanying sound. It can appreciated that such multimedia service applications will most likely be developed by different multimedia application providers. If that turns out to be the case, then it would be desirable to allow a user to access different multimedia applications developed by different providers thereof, regardless of the type of equipment, e.g., computer terminal, that the user employs to effectuate such access.

It can be appreciated that developing a multimedia application is not an easy task, and typically entails designing the application, "debugging" it and then storing it on a multimedia system for presentation to a user. It is often the case that the application will need additional "debugging" after it has been stored in the multimedia system to deal with interface problems that might occur between the newly designed multimedia application and multimedia system. A designer/provider of an multimedia application may deal with the latter problem by duplicating the multimedia system and using the system as a tool during the design/development and debugging phases of a multimedia application. It can be appreciated, however, that duplicating a multimedia system for the purpose of using it to design and debug multimedia application could prove out to be expensive and somewhat unnecessary.

SUMMARY OF THE INVENTION

The provisioning of multimedia services is enhanced by using a communications protocol which allows a multimedia application to be divided into a plurality of segments for presentation in an order requested by a user. Specifically, the inventive communications protocol is embedded in a plurality of messages defining respective functions (telecommunications, data, audio, etc.,) in a way that allows a multimedia application to be segmented into a number of logical blocks for presentation to the user. Thus, in accord with the invention, when the user interfaces with a particular multimedia application and has entered a particular request indicative of one of the aforementioned functions, then the user's associated data terminal generates a message defining the function and sends the message to the multimedia system, which responds thereto by performing the requested function with respect to a particular one of the blocks forming the multimedia application that the user is accessing.

In accord with another aspect of the invention, a provider of a multimedia application may send the application to the multimedia system via the telecommunications network for storage thereon and then interact with the stored application via the telecommunications network for a number of different purposes, including "debugging" and/or developing the application.

DETAILED DESCRIPTION

Figure 1:
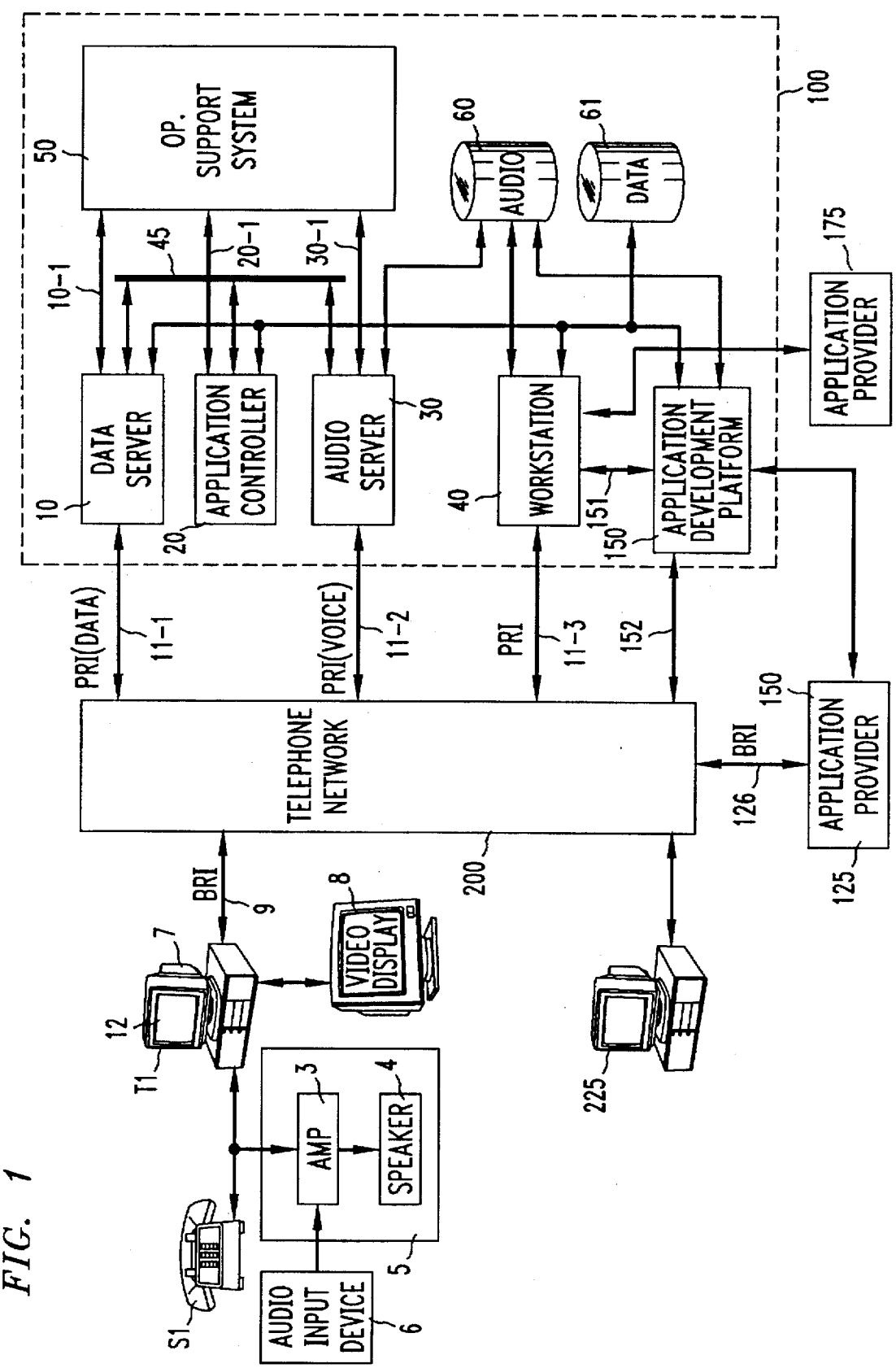
FIG. 1 shows a multimedia system in which the principles of the invention may be practiced.

Turning now to FIG. 1, there is shown a broad block diagram of multimedia system 100 embodying the principles of our invention. In particular, system 100 includes a number of controllers which cooperate with one another to present a particular multimedia application to a user. Such controllers include data server 10, application controller 20, audio server 30, workstation 40, development platform 150 and operation support system 50. Data server 10, which may be, for example, the 386-WGS workstation available from AT&T, operates under the MS DOS operating system and is programmed to provide a data function in conjunction with the presentation of a multimedia application. More particularly, data server 10 interfaces with the user via communications path 11-1 and responds to receipt of a request from the user by determining whether it will process the request itself or pass the request to either application controller 20 or audio server (controller) 30. For example, if the request is directed to (a) audio, such as a particular selection of music, then data server 10 passes the request via LAN 45 to audio server 30 for processing; or (b) a particular multimedia application, then data server 10 passes the request to application controller 20 via LAN 45. If the request relates to a data function, for example, particular data stored in memory 61, then data server 10 unloads the data from memory 61 and transmits the data to the user via path 11-1. In an illustrative embodiment of the invention, such data may be, for example, digitized images, text, graphic primitives, animation primitives, executable programs, etc., stored in database 61. In an illustrative embodiment of the invention, such data may be stored in database 61 in a compressed format. (As will be explained below, the decompression of such data is performed by terminal Ti before it is presented to a user.) The interface that data server 10 presents to the user also operates to recognize the receipt of an incoming call via path 11-1. In an illustrative embodiment of the invention, path 11-1 may be, for example, an ISDN Primary Rate Interface (PRI) communications path comprising 23 B channels and one D channel. As is well-known, each B channel is used for transporting a telephone call (voice or data) and the D channel is used to convey signaling information relating to the calls that are transported over the B channels. Communications paths 11-2, 11-3 and 152 may also be ISDN PRI.

Specifically, when the user places a call to multimedia system 100, telephone network 200 processes the call in a conventional manner and alerts system 100 to the incoming call via an ISDN D signaling channel extending to data server 10 via path 11-1. Such alerting includes notifying data server 10 of the identity (number) of the ISDN B channel that will carry the call. Server 10, in turn, responds to such signaling by sending a call accept message to network 200 via the signaling channel, thereby establishing a communications connection between system 100 and the user. At that point, the user and system 100 may begin to exchange messages with one another, as will be explained below.

Application controller 20, more particularly, is responsible for executing all multimedia applications that system 100 (controller 20) sends to the user's terminal, e.g., terminal T1. That is, controller 20, which may be, for example, the 386-WGS computer available from AT&T, operates under the control of the Unix operating system to present a multimedia application to the user, in which the application may include data and/or voice (audio). As mentioned above, such data may include digitized images, text, graphics primitives, animation primitives, executable programs, etc., stored in database 61. The accompanying analog portion of such data is stored in digital form in database 60. For the data portion of an application, controller 20 directs data server 10 via LAN 45 to unload the data from memory 61 and present the data to the user via path 11-1. For the audio portion of the application, controller 20 directs audio server 30 via LAN 45 to unload the associated digitized audio from memory 60 and present the audio to the user via an ISDN channel of path 11-2. Application controller 20 may also direct server 10 (30) to expect receipt of a data (audio) file that is to be entered by the user and to store the file in memory 61 (60). Application controller 20 transmits information to the user by placing that information on LAN 45 for delivery to the user via data server 10. Such information may relate to the status of a requested application or an error associated therewith.

Audio server 30, which may also be 386-WGS and which also operates under the UNIX operating system, provides an interface between the user or application controller 20 and memory 60. In an illustrative embodiment of the invention, digitized audio associated with respective applications and/ or digitized audio provided by a user is stored in memory 60. Audio server 30 is therefore responsible for the storage and "playback" of audio that is associated with a respective multimedia application.

Operations Support System (OSS) 50, which may be, for example, the CompuLert system available from AT&T, monitors the overall operating status of system 100. Specifically, data server 10, application controller 20 and audio server 30 are arranged to periodically send a status message to OSS 50 via communications links 10-1, 20-1 and 30-1, respectively. Such status messages (which are sometimes referred to as "heartbeat" messages) indicate to the OSS that the respective controller or server is still operational. If OSS 50 fails to receive such a message within a predetermined period of time, e.g., once each minute, then OSS 50 assumes that the controller or server which failed to send the status message may be faulty, and therefore notifies a system 100 administrator by outputting an appropriate message to a system terminal (not shown). If a controller or server detects an error itself, e.g., a possible fault in path 11-1, memory 60 or 61, or LAN 45, then the controller or server notifies OSS 50 of that fact via a respective one of links 10-1, 20-1 or 30-1. OSS 50, in turn, outputs a message identifying the fault to the aforementioned system terminal.

The user may access system 100 by operating terminal T1, which may be, for example, a 386 or 486 based processor operating under the control of the MSDOS operating system. Specifically, terminal T1 includes a library of multimedia functions associated with system 100 and conventional telephony circuitry so that it may interface with network 200. Such circuitry, which may be, for example, the model IDC circuit board available from DGM&S Inc., of Mount Laurel, N.J., implements an ISDN Basic Rate Interface (BRI) interface represented in the FIG. by communications path 9. Such functions include, inter alia, decompressing data received over one or both of the BRI B channels of path 9 from system 100. The decompressed data may then be displayed on the terminal T1 display 12 or stored in memory internal to T1, such as floppy or hard disk memory. In an illustrative embodiment of the invention, the decompressed data may be an executable program that is to be run on terminal T1 after it has been stored and then executed in terminal T1.

It is seen in FIG. 1 that terminal T1 is associated with station set S1 and optional audio system 5. Audio system 5, more particularly, operates to present audio information to the user, in which the audio information is received from system 100 via either one of the two B channels of path 9. Alternatively, a user may present audio information to system 100 for storage in memory 60 by speaking into the station S1 handset. The speech signals received by station S1 are then presented to the aforementioned IDC circuitry where they are digitized and then transmitted to system 100 over a B channel of path 9. It is also seen from the FIG. that terminal T1 may be associated with a conventional television monitor, or video display, 8. In this way, information that is displayed on display 12 of terminal T1 may also be displayed on monitor 8. To do so, terminal T1 includes a conventional circuit for converting VGA formatted signals into NTSC video signals for display on monitor 8. As such, information may be displayed on either or both terminal display 12 or monitor 8.

The user may also employ audio input device (or recorder) 6 as a means of transmitting audio via terminal T1 to system 100 for storage in memory 60 as an audio file. As such, audio input device 6 may be, for example, a microphone or an audio tape recorder. Audio signals outputted by the microphone (or recorder) 6 are presented to amplifier 3 which then sends the signals to the IDC circuitry of terminal T1 for transmission to path 9 as discussed above.

(It is noted that the user may also store data on database 61, associated with server 10, as will be discussed below).

In an illustrative embodiment of the invention, a library of multimedia functions forming a unique multimedia protocol is provided to support the development and presentation of a multimedia application to a user via a telecommunications network. Specifically, the protocol is arranged, in accord with an aspect of the invention, so that it is independent of the architecture of system 100, the multimedia application and terminal T1. Because of this, different multimedia functions may be seamlessly distributed between system 100 and terminal T1. The protocol thus facilitates communications among the elements forming a networked multimedia system including a user's terminal. Advantageously, then, a multimedia application developed in accord with the protocol may be run on most multimedia systems as long as the systems support the inventive protocol.

The protocol, more particularly, includes messages for invoking (a) telecommunications functions, (b) data access functions, (c) audio functions, and (d) distributed application functions. The telecommunications functions include a set of messages for establishing a communications connection between terminal T1 and system 100 and for establishing a conferencing connection. This message set includes (a) connect, (b) disconnect, (c) bridge call, and (d) unbridge call. The data access functions includes a set of messages comprising (a) download data file, (b) upload data file, (c) stop data download, (d) stop data upload, (e) resume data download and (f) resume data upload. The audio functions include (a) play audio file, (b) pause audio playback, (c) resume audio playback, (d) skip audio playback, (e) adjust volume, (f) stop audio playback, (g) record audio, (h) pause audio record, (i) resume audio record and (j) stop audio record. The distributed application functions includes a set of messages comprising a (a) start application, (b) stop application, (c) pause application and (d) resume application. (The various commands associated with the audio server are shown in Appendix A. The format and function of the data server and application controller commands are similar to those shown in Appendix A.)

As a result of the inventive protocol, a multimedia application may be, in accord with an aspect of the invention, segmented into logical components, or blocks, the presentation of which is under the control of the user. Advantageously, then, only those blocks of the multimedia application called for by the user are downloaded to the user's terminal, thereby making efficient use of the telecommunications network bandwidth. Advantageously, such segmentation allows the components of the application to be stored and transmitted in a manner most suitable to the type of data being transmitted. For example, audio information may be stored in database 60 in a predetermined format, e.g., an ADPCM format, which may be easily decoded and coverted into a voice signal for transmission over the telephone network to the user.

As a result of the protocol, an application may be partitioned (segmented) into respective blocks. What this means is that an application is presented to a user in an efficient and rapid manner. For example, particular blocks of an application may be downloaded to terminal T1 in a background mode and stored therein such that the blocks may be quickly brought up on terminal display 12 as they are called for by the user. For example, a block of the application program supporting a displayed menu item having the highest probability of user selection may be downloaded in the background first, the block supporting the menu item having the next highest probability of user selection may be downloaded next, and so on. Accordingly, it is likely that when the user selects a displayed menu item, the application data and/or software supporting that selection will be resident (stored) in the user's terminal. (Alternatively, the blocks may be downloaded sequentially based on their respective sizes, rather than their selection probability. Still, the application blocks supporting displayed menu items may be downloaded in parallel and in the background mode (i.e., preloading), in which the network bandwidth is allocated among the blocks based on the probability of their associated menu items being selected by the user. As another alternative, such bandwidth allocation may be based on the size of a data block. The order in which such blocks are downloaded sequentially or in parallel in the background may also be specified explicitly by the application provider. That is, a larger portion of the bandwidth is allocated to a large data block than to a smaller data block. Conversely, a larger portion of the bandwidth may be allocated to a smaller data block to ensure that the block is resident on the user's terminal before the user makes a menu selection.)

With the foregoing in mind, we now discuss the manner in which a multimedia application is requested and presented to a user associated with station S1 and terminal T1. Specifically, when the user enters a command to invoke the multimedia function, terminal T1 displays a request for the user to enter a unique system 100 identifier, e.g., a conventional login, assigned to the user and to enter the user's password. Responsive to the user complying with the request, terminal T1 causes its associated telephone circuitry to place an ISDN data call via network 200 to system 100. When system 100 (data server 10) accepts the call, then network 200 establishes a connection between one of two B channels of path 9 and an idle B channel of path 11-1. Once the ISDN connection is established, then terminal T1 transmits the login and password that the user entered. Upon receipt thereof, data server 10 returns an acknowledgement to terminal T1 if it finds that the received login and password are valid. Otherwise, data server 10 returns an invalidity message to terminal T1 and then disconnects from the call.

In addition to the acknowledgement, data server 10 returns a menu of the multimedia applications that are resident on system 100, in which the menu is in a compressed format. Data server 10 also sends with the menu information identifying where each of the multimedia applications associated with respective ones of the menu items are located in memory 61 and/or memory 60. Upon receipt thereof, terminal T1 using a conventional decompression algorithm decompresses the data (menu) and displays the decompressed menu on terminal display 12. Terminal T1 also stores the decompressed application locating information in its internal memory.

The displayed menu of multimedia applications may include, for example, a travelogue, games, catalog shopping, education, etc. The menu may also include a multimedia application relating to the well-known Sesame Street (trademark of the Childrens Television Workshop Corporation) television program. Accordingly, the following will be discussed in the context of the latter application. (It is understood, however, that the following discussion equally pertains to the other multimedia applications, e.g., the multimedia applications mentioned above.)

If the user selects the Sesame Street application, such as by pointing a conventional mouse cursor to that displayed menu item and operating an associated mouse button, then terminal T1 obtains application locating information relating thereto from its internal memory and forms a message containing a request to transmit the Sesame Street application and the locating information relating thereto. Terminal T1 then transmits the message to system 100 over the ISDN connection established by network 200. Upon receipt of the message, data server 10 extracts the locating information from the message and uses that information to determine the storage location of the first block of the requested application in database 61. Data server 10 then unloads the first block of the application and transmits it in its compressed form to terminal T1, in which the first block comprises (a) a screen that is to be displayed on terminal T1 and (b) an executable program. Upon receipt of the first block, terminal T1 decompresses the data and executes the received program. The latter program, in turn, displays the accompanying screen on display 12 and sends a request to the audio server to begin the playback of the Sesame Street theme song. The screen shows a room filled with various objects, e.g., a ball, train, bookcase, arcade game, etc. Each of the objects represents a menu selection. For example, selecting the (a) ball will cause a bouncing ball to be displayed accompanied by an associated sound effect, (b) train will display a train running on a circular track and accompanied by an associated sound effect, or (c) bookcase will cause a story book function to be displayed. As an aspect of the invention, system 100 may download parts of the applications under consideration, while the user is deciding which menu item to choose, as mentioned above. For example, the ball and train are animation-type applications that may be downloaded prior to the user selecting a menu item.

If the user selects, for example, the train multimedia application (moving image plus sound), the application block supporting that selection is already resident on terminal T1. Accordingly, terminal T1 may quickly respond to that user selection by displaying the train animation and a playback of the associated sound effect. The train animation, more particularly, displays a moving train on a somewhat circular track with accompanying audio characterizing a train whistle. If, on the other hand, the user selects the bookcase menu item, then terminal 1 displays a menu supporting that application, in which the menu may have been already stored in terminal TI as a result of the pre-downloading feature. The latter menu, when displayed on display 12, shows images depicting the covers of different books, each containing the title of the respective book. The menu is accompanied by background audio, i.e., the Sesame street theme song. Each such book is formed from a series of pictures and accompanying audio which "tells" a story. While the user is deciding which menu item to select, system 100 downloads, as discussed above, the first page of each such book to terminal T1. When the user selects a book, terminal T1 displays the prestored first page of the selected book, In addition, terminal T1 forms a message containing the name of the audio file that is associated with the selected first page and sends the message to system 100 via path 9. If the application requires an audio channel, (which would be the case to play back the aforementioned sound effect) then the application sends a request to that effect to audio server 30 via data server 10. Audio server 30, responsive to the request, sends the appropriate commands to network 200 to establish path 11-2.

Upon receipt of the message, data server 10 passes the request to audio server 30 via LAN 45. Server 30, in turn, unloads the identified file from memory 60 and transmits the file as a continuous (isochronous) bit stream over an associated B channel of path 11-2 extending to terminal T1 via network 200. Terminal T1, in turn, converts the bit stream as it is received into analog signals for presentation to station S1 or audio system 5. Similarly, while the user is listening to the audio and viewing the page, system 100 downloads the next page of the selected book to terminal T1. Terminal T1 and system 100 continue operating in the described manner until the last page of the selected book has been presented to the user. At that point, the user may request a redisplay of the book menu and proceed as discussed above. Alternatively, when the book selection menu is displayed the user may select the main menu.

As an aspect of the invention, a user, e.g., the user associated with station S1 and terminal T1, may access an "live" agent, e.g., a travel agent, while viewing a particular multimedia application. For example, if the user is viewing a multimedia travelogue application on the display 12 with accompanying audio outputted to either station S1 or audio system 5 and the user desires to be connected to a travel agent, then the user may enter a request for such a connection to system 100. The user may do this by pointing the screen cursor to a particular icon displayed with the travelogue and selecting the icon in a conventional manner. Terminal T1 in response thereto sends a bridge_call message (discussed below) to system 100. Upon receipt of that message, data server 10 instructs audio server 30 via LAN 45 to place a call over an available ISDN B channel of path 11-2 to an agent (operator) associated with the application, such as attendant, or operator, 225. When the call is answered, audio server 30 then signals network 200 to bridge that call to the user's call and extending to system 100 via path 9. Audio server 30 then disconnects from the bridged call and the travelogue application is suspended until the call to the agent is completed. When the call is completed, audio server 30 then reconnects to terminal T1 via path 11-2. System 100 then continues the presentation of the travelogue application.

As seen from FIG. 1, system 100 also includes workstation 40 and Application Development Platform (ADP) 150 which are used to interface system 100 with multimedia application development equipment associated with developers of multimedia applications, such as application providers 125 and 175, respectively. In an illustrative embodiment of the invention, workstation 40, which may be, for example, the Gateway 2000 computer available from Gateway Inc., provides a mechanism whereby an application provider, e.g., provider 125, may store an application that is being developed in system 100 (databases 60 and 61). The provider 125 may do so by placing an ISDN call via BRI ISDN path 126 to establish a connection to workstation 40. Once the connection has been established, then provider 125 may communicate with workstation 40 to direct the latter to store an application in memory 60 and/or 61. To effect the transfer of the application to system 100, provider 125 using the upload data command (discussed below) transmits each file forming the application to workstation 40 via path 126. Workstation 40, responsive to receipt of a file, stores the file in memory 60 or 61 based on the type of data (audio or digital data) in the received file. Once all such files have been stored in system 100, then provider 125 may "debug" the stored application by placing a call to Application Development Platform (ADP) 150 via path 126.

ADP 150, which may also be a Gateway 2000 computer, replicates servers 10 and 30 and controller 20 such that it answers the call and then emulates the system 100 functions in conjunction with presenting the provider's stored application to the provider as though the provider was a user, such as the user associated with station S1 and terminal T1. Thus, in accord with an aspect of the invention, system 100 provides a functionality which allows an application provider to store in system 100 an application that the provider is developing and then access system 100 to "debug" the application (i.e., uncover and correct errors) over telecommunications network 200. Thus, the application provider interfaces with an associated application virtually the same way that a user will ultimately interface with the application.

Figure 2:
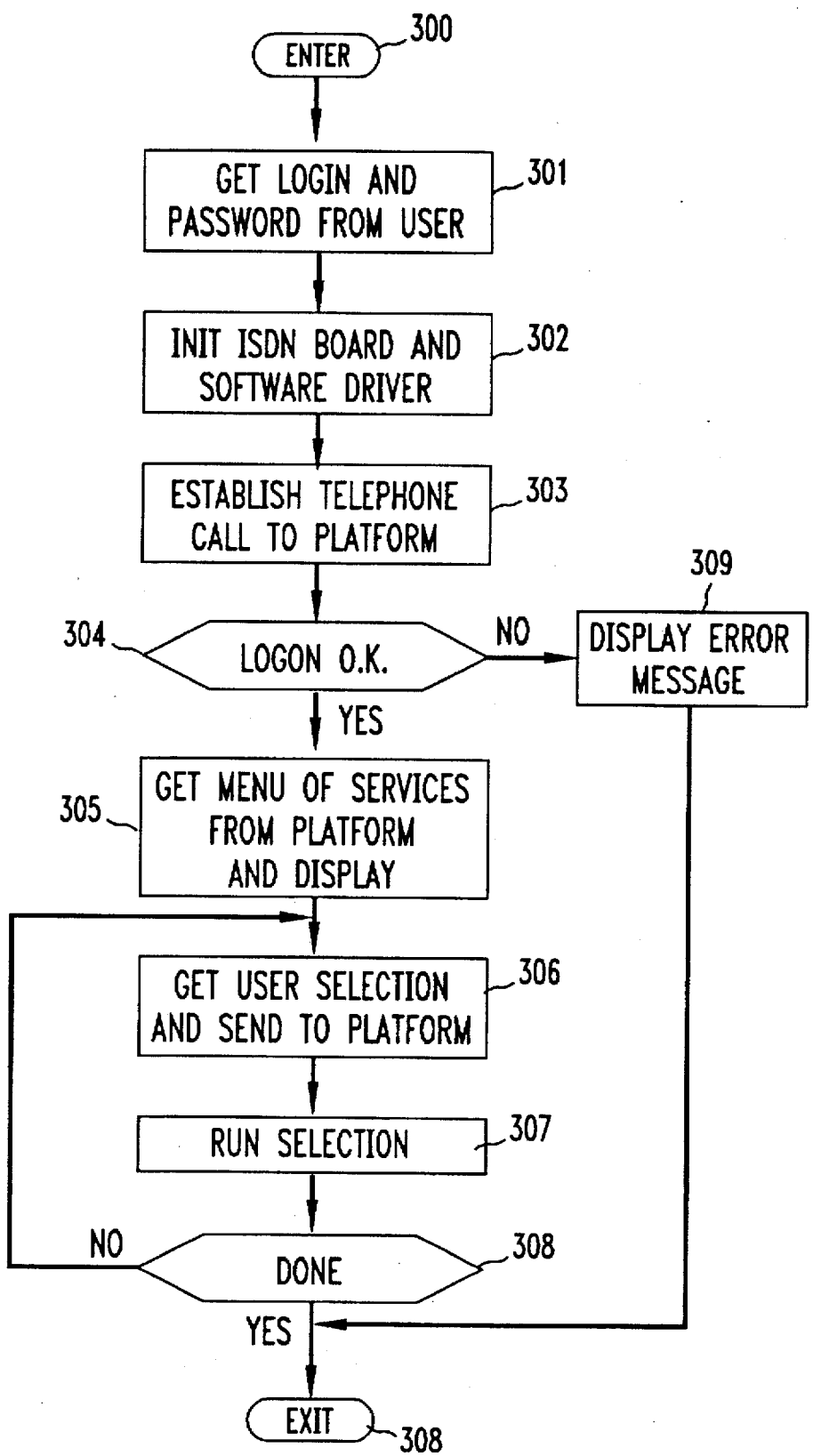
FIGS. 2 through 7 illustrate in flow chart form the program which implements the principles of the invention in the user terminal of FIG. 1.

The software which drives a multimedia application may be divided between terminal T1 and system 100. Turning then to FIG. 2, there is shown the main menu program which is stored in terminal T1 and which allows a user operating terminal T1 to access multimedia system, or platform, 100. More specifically, when the user invokes the main menu program, the program is entered at block 300 and proceeds to block 301 where it prompts the user to login and enter a password. When the user does so, the program proceeds to block 302 where it initializes the aforementioned ISDN board as well as the software which controls the operation of the board. The program then establishes a telephone call to multimedia platform 100 using one of the two basic rate ISDN channels (block 303). When the telephone call is established, the main menu program and system (platform)

100 then communicate with one another. Such communications includes the passing of the entered password and logon to platform 100. If platform 100 finds the logon to be invalid, then platform 100 terminates the ISDN connection. The program responsive thereto displays a message indicative of that fact and then exits. However, if the platform finds that the entered logon is valid, then it notifies the program of that fact (block 304) and downloads a menu of multimedia services that the user may access. Upon receipt thereof, the program (block 305) displays such services and waits for the user to enter a selection (block 306). When the user enters a selection, the program (block 306) sends the selection to platform 100 and then runs the selection (block 307) as it is received from platform 100, as will be discussed below. When the multimedia selection is completed, then the program redisplays the menu of services (block 308) and waits for the user to enter a new selection. When the user enters a selection, then the program sends the entered selection (block 306) to the multimedia platform, as discussed above. If, on the other hand, the user desires to terminate the session and enters an indicator indicative of that fact, e.g., a "q" for quit, then the program notifies the platform thereof and terminates the ISDN connection.

Figure 3:
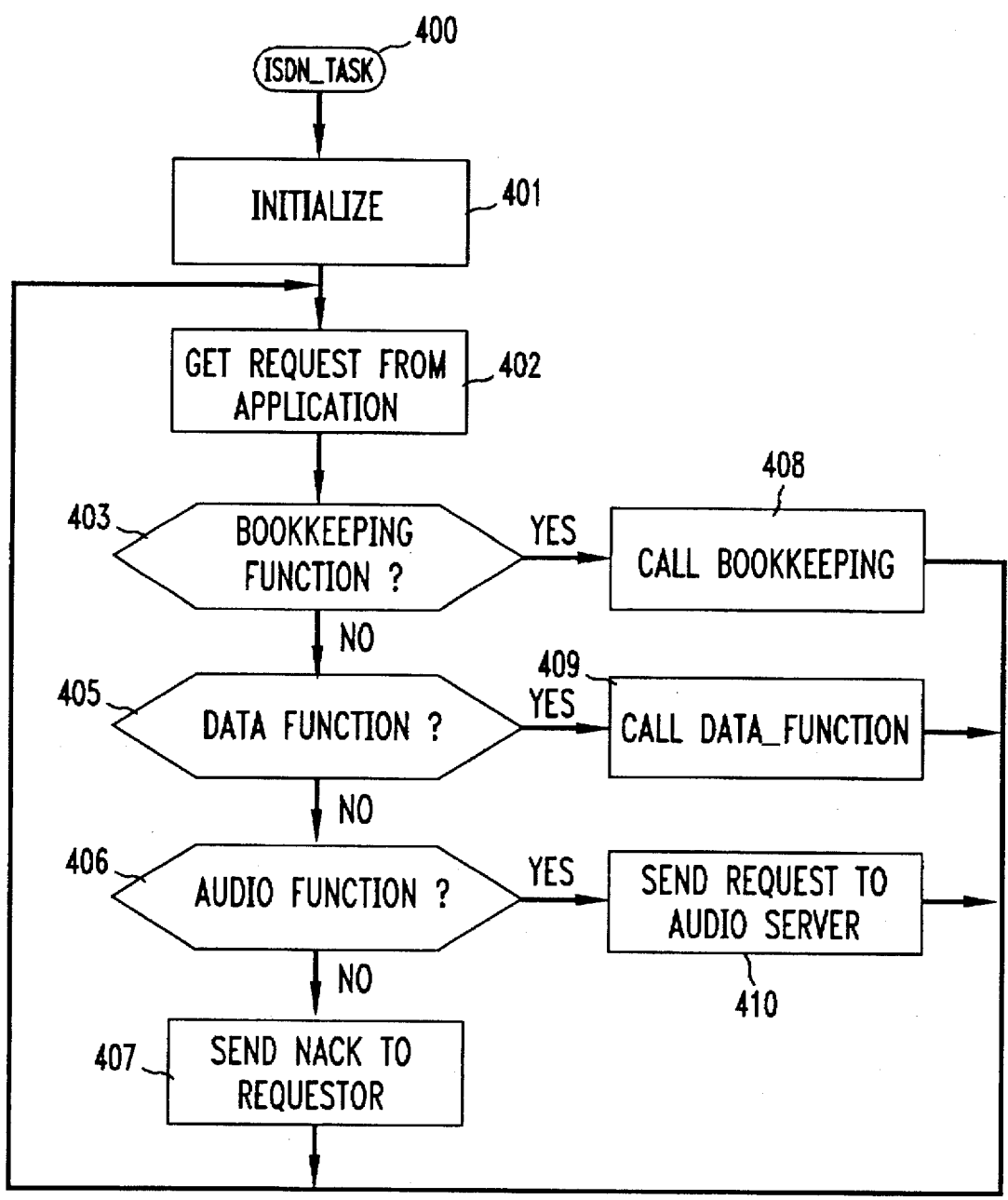

The main menu program is supported by a number of other programs, or tasks, which are designed to run in the background mode. One such program performs an ISDN task, as shown in FIG. 3. Specifically, when the task is entered at block 400 it proceeds to initialize a number of functions (block 401). Such initialization includes the setting up of queues that will be required for the storage of data files relating to the selected application. Such data files include the downloading of files from the platform to the user's terminal and vice-versa. The initialization also includes invoking data compression and decompression tasks. The program then waits for the receipt of a request from the application, i.e., a request to "get" a next data file (block 402). The ISDN task also includes the invoking (block 403) of a so-called bookkeeping task (block 408) that tracks the logging on and logging off functions that the user's terminal performs during its communications with the platform as well as different ISDN functions, as will be discussed below.

The ISDN task (block 405) also invokes a data transfer function which operates to transfer digital data files between the user's terminal and platform (block 409). Similarly, the ISDN task also invokes (block 406) an audio function (block 410), which operates under the direction of the selected application to receive digitized audio file(s) from the application platform and "play" the audio over speaker 4. If the request that is received from the selected application is none of the above functions (blocks 403, 405 or 406), then the ISDN task sends (block 407) a so-called negative acknowledgement to the application and waits for the receipt of the next request from the selected application (block 402).

Figure 4:
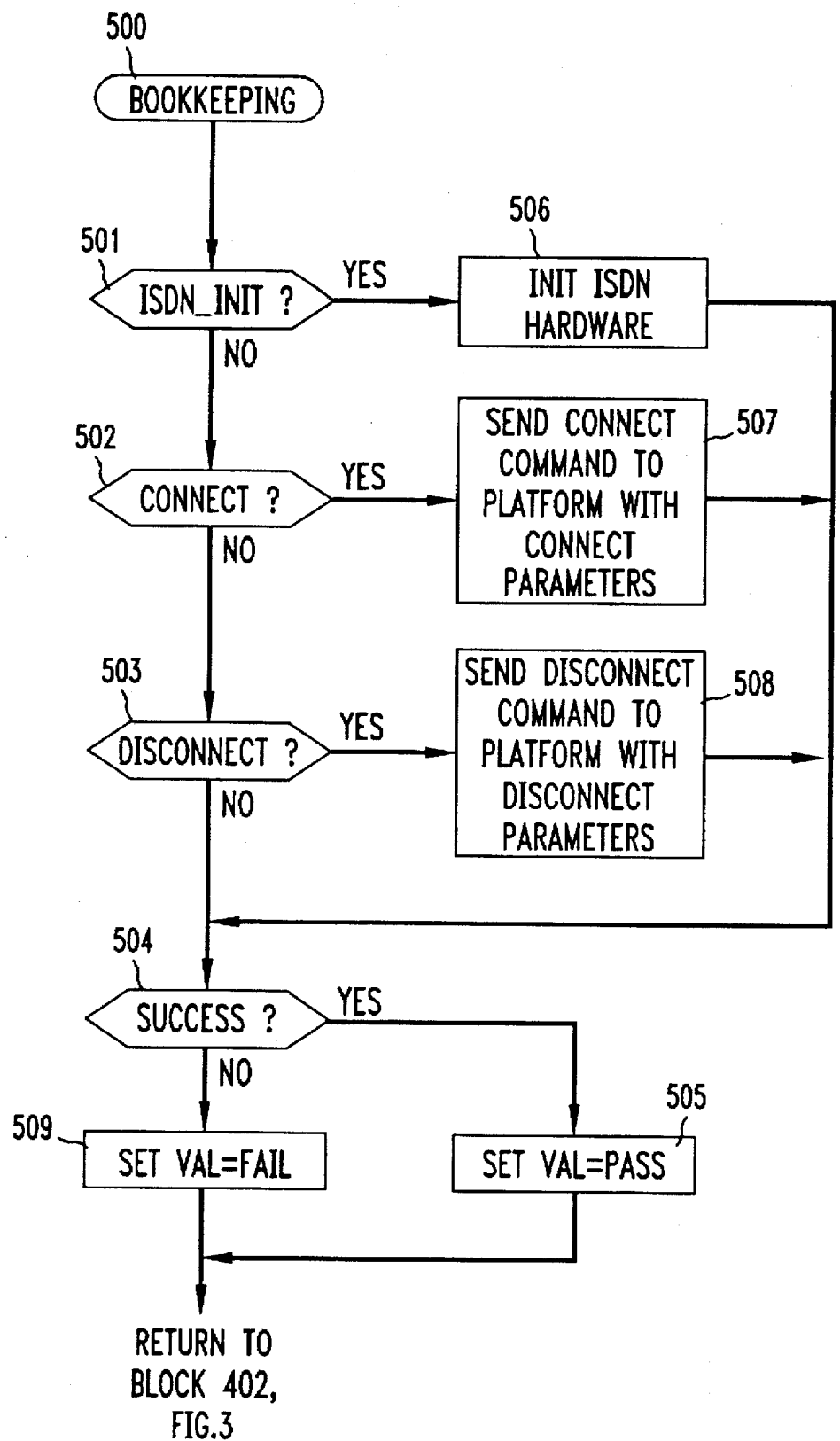

A flow chart of the aforementioned bookkeeping function 403 is illustrated in FIG. 4. Specifically, when the bookkeeping function is invoked (block 500), it determines if the received request is a request to initialize the aforementioned ISDN hardware (block 501). If that is the case, then the program initializes the ISDN hardware (block 506). The request to do such an initialization usually results when the application program concludes that the ISDN communications path between the user's terminal and platform 100 is to be in an unknown state, e.g., it is "hung up". If that is not the case then the program (block 502/503) checks to see if the request is a request for a particular type of ISDN connection/disconnection. For a connect request, the program (block 507) sends a so-called connect command containing parameters defining the particular connection to platform 100. For a disconnect request, the program (block 508) sends a disconnect command containing the parameters defining the disconnect to platform 100. If the particular function (i.e., block 506, 507 or 508) is performed successfully (block 504), then the program sets (block 505) an indicator called "VAL" to a one to indicate that the requested function was completely successful, and then returns to block 402. Otherwise, the program sets VAL to zero (block 509) to indicate that the requested function 405 failed.

Figure 5:
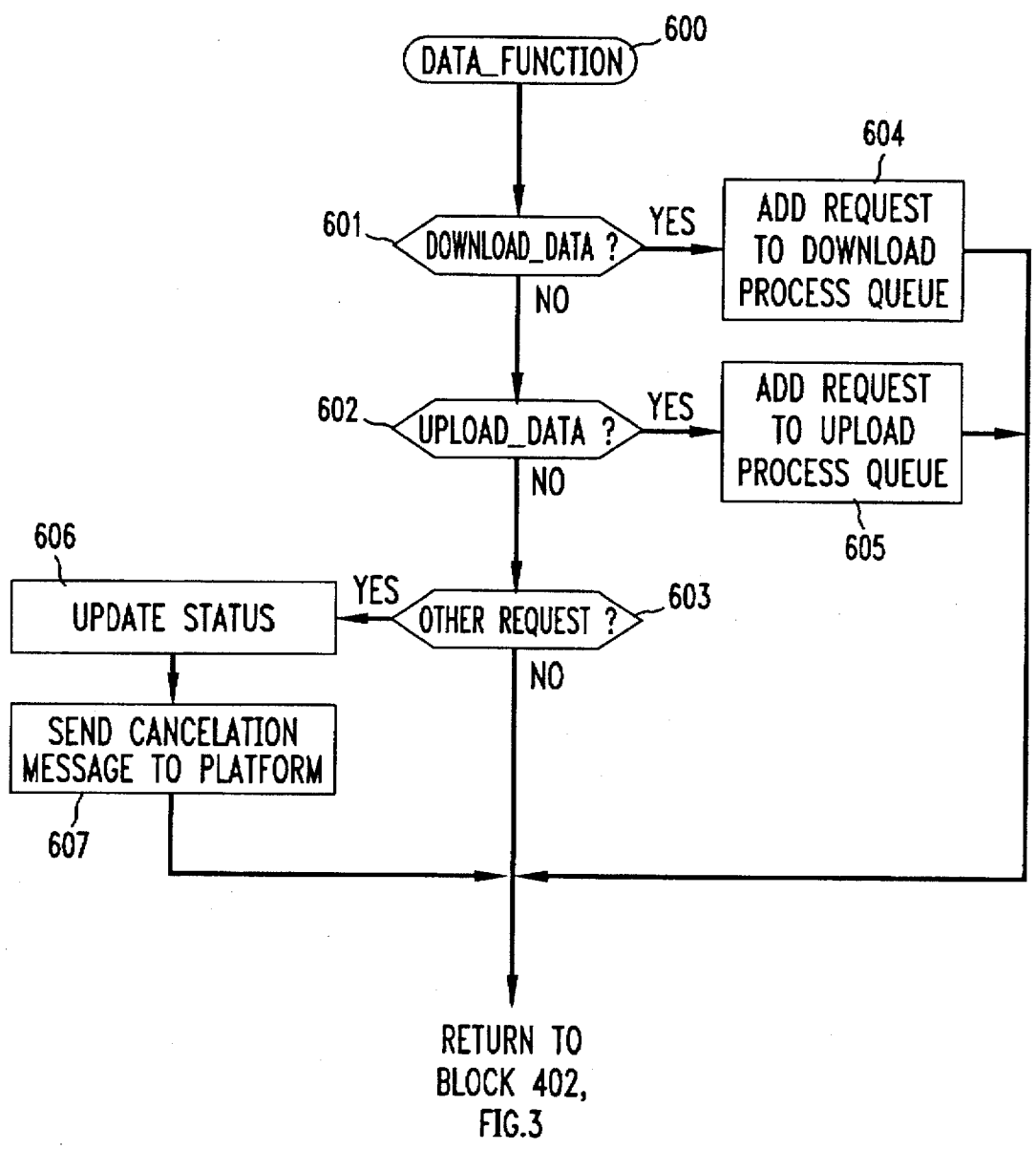

A flow chart of the aforementioned data function is illustrated in FIG. 5. In particular, when the data function is invoked (block 600) it determines the type of data request that was received from the selected application. If the data request is found to be a so-called request to download data from the platform to the user's terminal (block 601), then the program adds the request (block 604) to a so-called download process queue and then returns to block 402 of FIG. 3. If, on the other hand, the request is found to be a request to upload data from the user's terminal to the platform (block 602), then the program stores the request (block 605) in a so-called upload process queue and then returns to block 402. If the program finds that the request is something other than a download or upload request (block 603), i.e., cancel a particular request that has already been queued for processing, then the program updates the status (block 606) for the particular request. The program (block 607) sends a cancellation message relating to the particular request to the platform, i.e., data or audio server. The program then returns to block 402.

Figure 6:
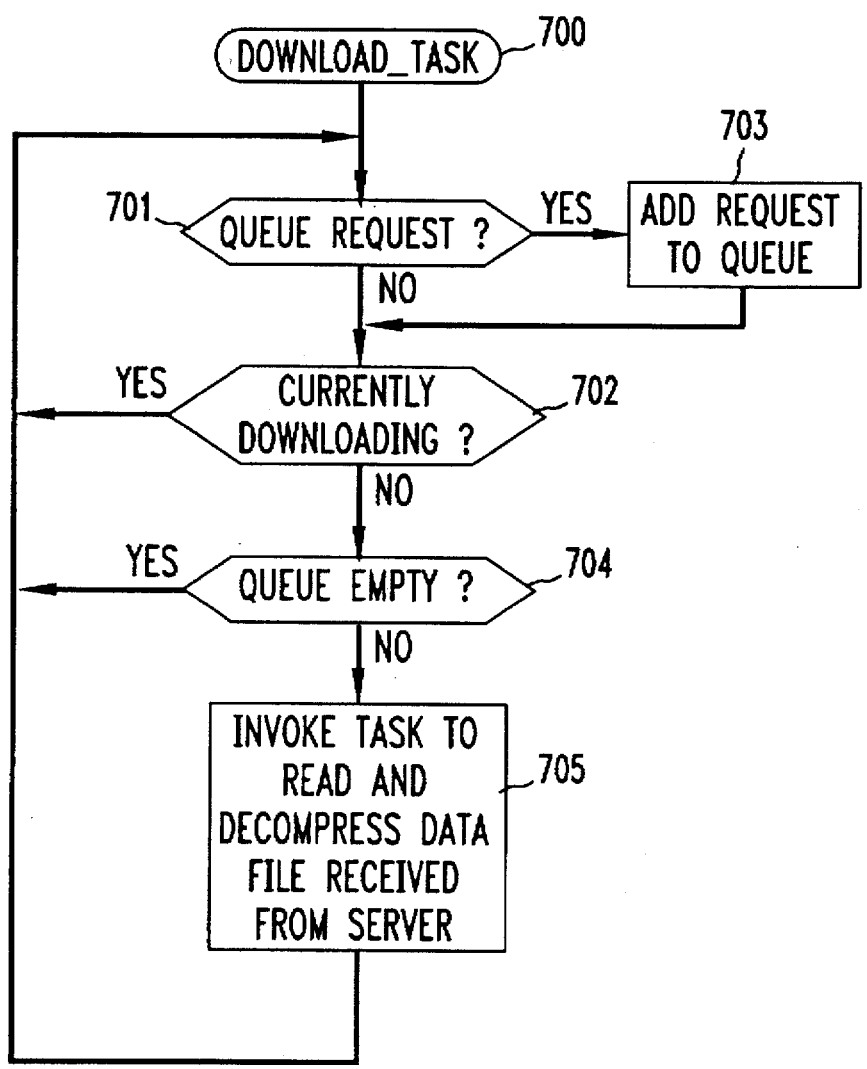

FIG. 6 illustrates in flow chart form the task, or program, which runs in the background mode to perform a data file downloading function. When invoked (block 700), the program (block 701) checks to see if it has received a request to download a file from the platform to the user's terminal. If that is the case, then the program (block 703) stores the request in an associated queue and then proceeds to block 702. The program (block 702) then checks to see if it is currently receiving data from the platform and returns to block 701 if it finds that to be the case. If not, then it (block 704) checks to see if its associated queue is empty and returns to block 701 if so. Otherwise, the program (block 705) invokes (spawns) a task that is designed to (a) read and decompress the data file when it is receives from the platform and (b) then process the file in accord with instructions contained in the file. The program then returns to block 701.

Figure 7:
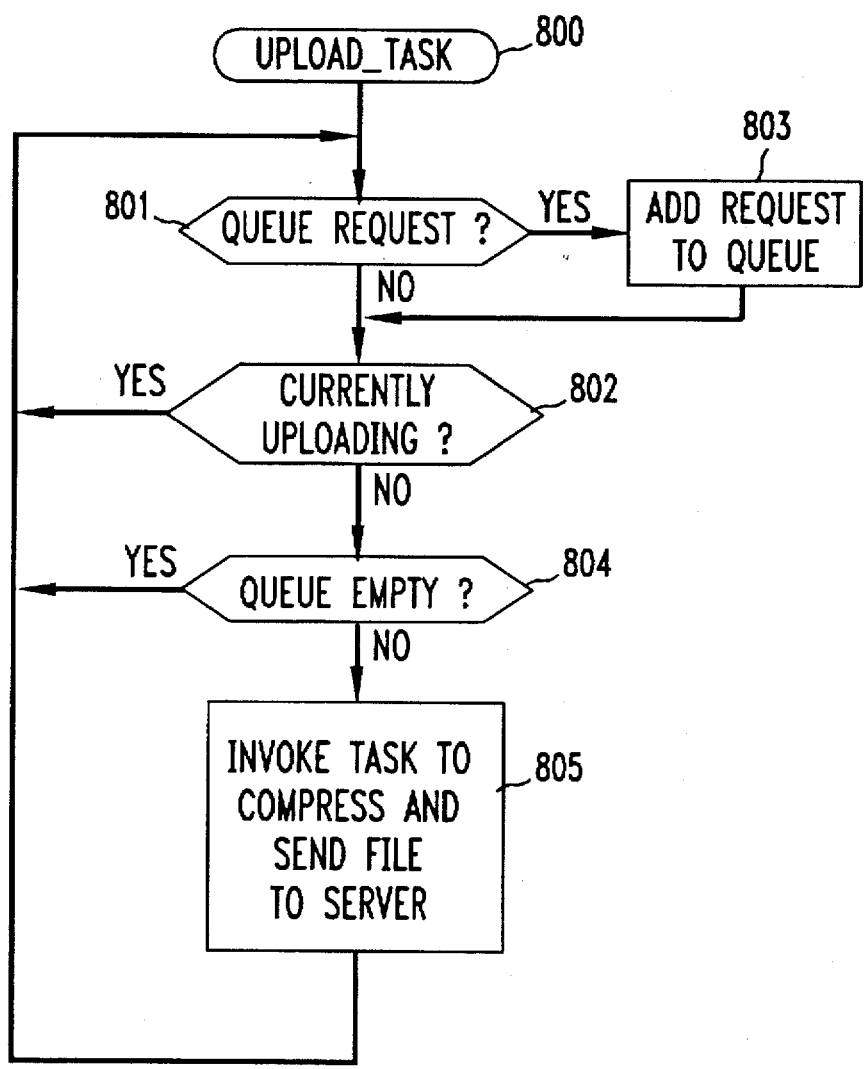
Figure 8:
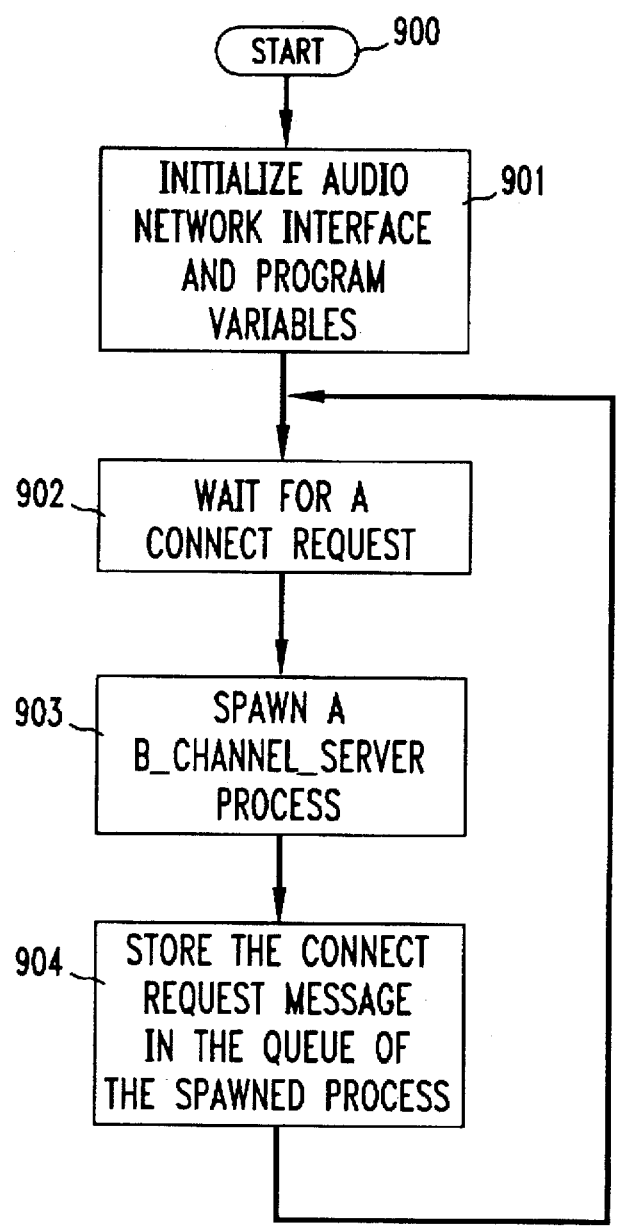
FIGS. 8 through 21 illustrate in flow chart form the program which implements the principles of the invention in the audio server of FIG. 1, FIGS. 22 through 31 illustrate in flow chart form the program which implements the principles of the invention in the data server of FIG. 1.

FIG. 7 illustrates in flow chart form the task, or program, which runs in the background mode to perform a data file uploading function. It can be appreciated that the program shown in FIG. 7 is somewhat similar to the program shown in FIG. 6, but performs a different function. Specifically, when invoked (block 800), the program (block 801) checks to see if it has received a request to transmit a particular file from the user's terminal to the platform, i.e., data or audio server. If that is the case, then the program (block 803) stores the request in an associated queue and then proceeds to block 802. The program (block 802) checks to see if it is currently transmitting data to the platform and returns to block 801 if it finds that to be the case. If the program finds that it is not in a upload mode, then it (block 804) checks to see if its associated queue is empty and returns to block 801 if it finds that to be the case. Otherwise, the program (block 805) invokes (spawns) a task that compresses the data file to be uploaded and then transmits the file to the platform. The program then returns to block 701.

FIGS. 8 through 19 illustrate in flow chart form the programs which implement the invention in audio server 30 (FIG. 1). Specifically, and referring to FIG. 8, when the analog server is turned on and "booted up" the program is entered at block 900 where it proceeds (block 901) to initialize an InterFace (I/F) circuit board that interfaces the audio server with the network. The program also initializes a number of program variables and then waits (block 902) for receipt of a message from the data server requesting an audio ISDN B channel to be connected through network 200 to user's terminal. Responsive to receipt of the message, the program (block 903) spawns a B__channel server process, and associates the latter process with the B__channel connected to the user's terminal, as discussed below. The program (904) then stores the received message in the queue associated with the newly spawned process and then returns to block 902 to await receipt of the next connect message from the data server 10.

Figure 9:
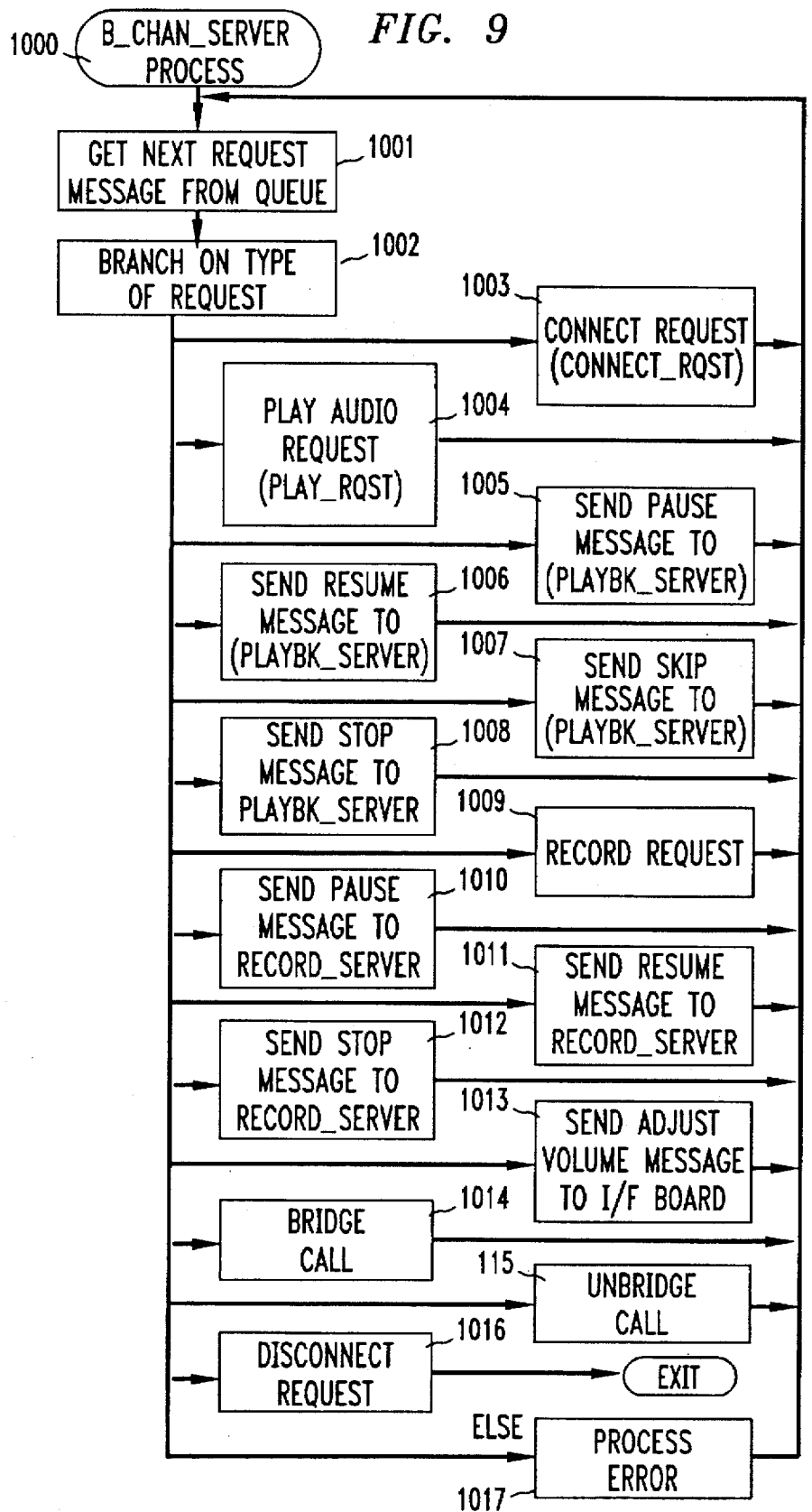

FIG. 9 illustrates in flow chart form the B__channel__server process that is spawned to service a particular ISDN B__channel connected to the audio server. That is, a B__channel_server process is spawned to serve each such connection. Specifically, when spawned, the B__channel__server process ("program") is entered at block 1000 where is initializes an a number of program variables that it uses to service a particular ISDN B channel. The program (block 1001) then unloads a request message from its associated queue and then (block 1002) branches on the type of request contained in the message. Such branching causes the program to branch to one of fourteen subroutines 1003 through 1016 illustrated in the FIG. The program branches to the last such subroutine 1017 when the the request message is of a unknown type. The subroutine 1017 records the error and then returns to block 1001 to process the next request message stored in the associated queue.

Figure 10:
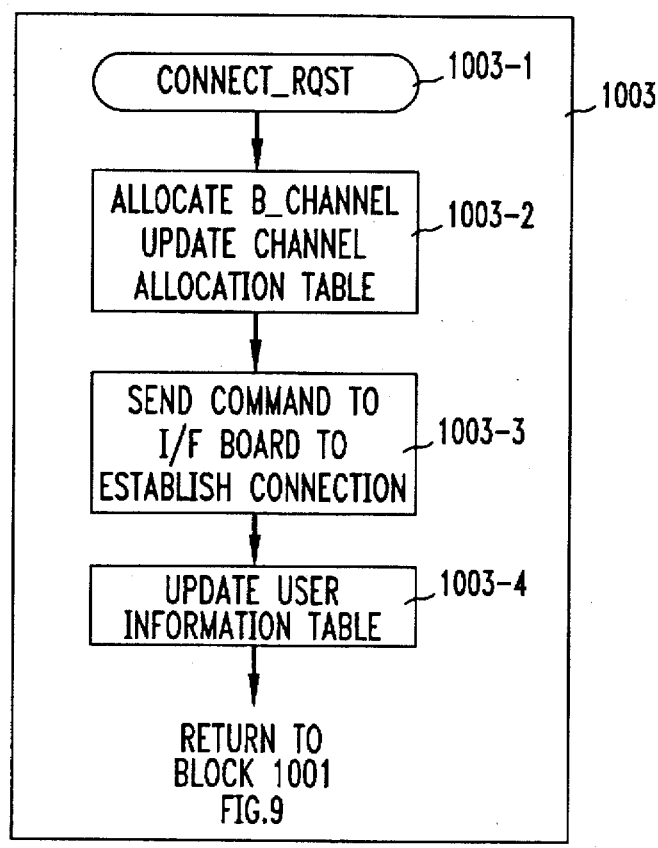

The remaining subroutines 1003 through 1016 will now be discussed in turn. Specifically, an expanded version of block 1003 is illustrated in FIG. 10. The program reaching block 1003 means that the request message is a request to establish a PRImary (PRI) rate B-channel audio connection between the audio server and the user's terminal. To do so, the program (block 1003-2) first checks a so-called global information table, which is accessed by both the data and analog servers, to determine if the two B-channels that can be assigned to a user have already been allocated as data paths by data server 10 and/or audio server 30.. If that is the case, then the program cannot respond to the connect message. Otherwise, the program assigns (allocates) an idle B-channel to the connection and then updates an associated memory table to show that the assigned channel is in use. The program (block 1003-3) then sends a command to establish the B-channel connection to the InterFace (I/F) circuit board that interfaces the audio server with the ISDN network (as mentioned above), in which the command contains the called telephone number and channel number of the selected B-channel. The I/F circuit, in turn, sends a call set-up message containing the telephone number and channel number over the associated ISDN D-channel, thereby effectively placing a call to the user's terminal.

The program (block 1003-4) then updates the aforementioned global information table which is used to track the status of the two ISDN channels that may be allocated to each active user and the application selected by the respective user. The program then returns to block 1001.

Figure 11:
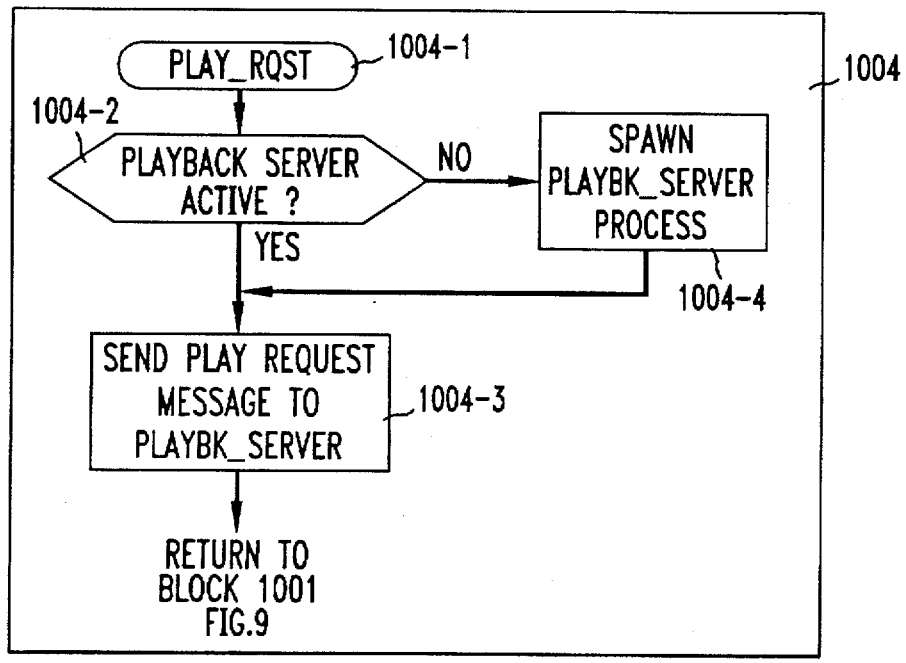

An expanded version of block 1004 is illustrated in FIG. 11, which is entered (block 1004- 1) when the received request relates to a request to play a particular analog file(s).

When entered, the program (block 1004-2) checks to see if a playback server has already been activated (spawned) as a result of a similar, but previous request. If that is case, then the program (block 1004-3) stores the current request in the queue of the playback server that had been spawned to serve the user's request for an audio application, e.g., the playback of a music file over the connected B-channel. The program then returns to block 1001. If that is not the case, then the program (block 1004-4) spawns a playback server routine (playbk__server) to serve the user's request, and then proceeds to block 1004-3.

Figure 12:
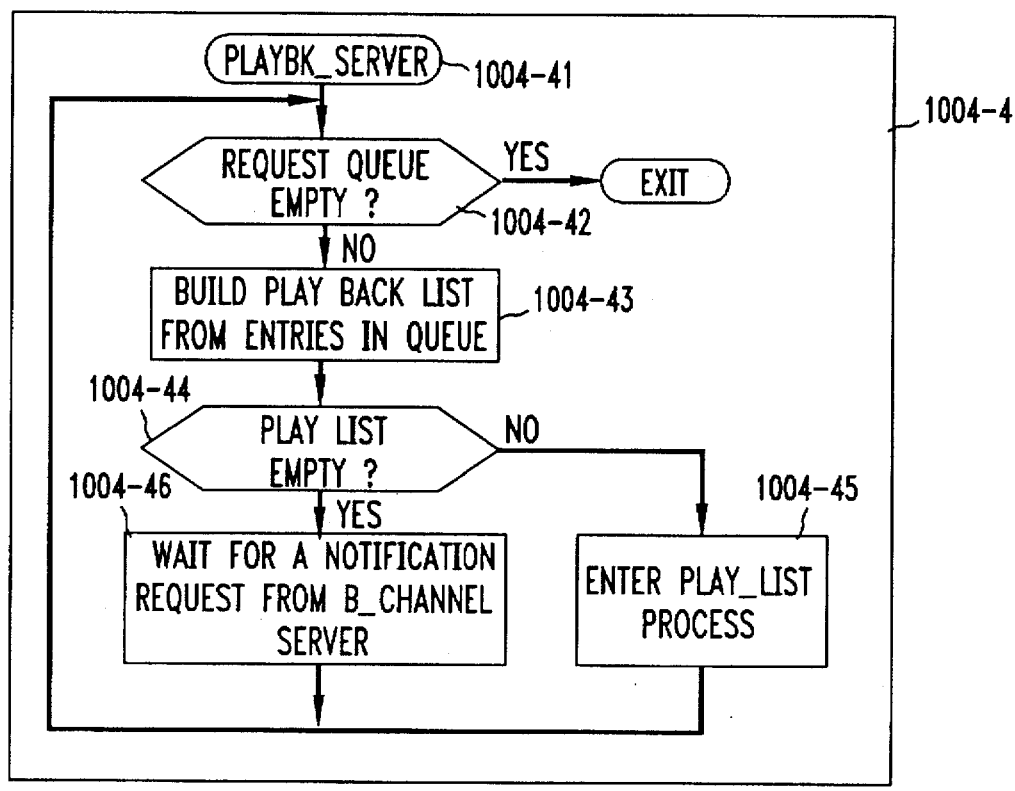

The program spawned at block 1004-4 (FIG. 11) is shown in FIG. 12. Specifically, when entered, the program (block 1004-41) initializes a number of variables and lists, e.g., a playback list, that it uses during the time that it is running. The program (block 1004-42) then checks its queue to see if it contains one or more play requests of files that are ready to "played" back to the user. If the queue is empty, then the program exits. (That is, the program keeps running as long as an entry is contained in the associated queue.) Otherwise, the program (block 1004-43) builds a list of the files, e.g., files containing digitized music or a story, that are associated with an indicator that the file can be "played". More specifically, to "play a file" means that the program unloads the digitized data forming the file from its associated audio memory 60 and supplies the data to the I/F board. The I/F board, in turn, converts the digitized data to an analog form and transmits the result over the analog B-channel assigned to the user. What is meant by indicator, is a request to play the file, pause, skip or resume (blocks 1005, 1007 and 1006, respectively) the playing of the file. A request identifying a file but associated with another queued request (indicator) to pause the playing of the file, is not removed from the queue and remains in the queue until a request to resume the playing of the file is received and stored in the associated queue. A request to stop (block 1007) the playing of a file or the completion of the "playing" of the contents of a file, causes the program to stop such playing and discard the associated request identifying that file.

When the program has completed the building of such a list, it (block 1004-45) then enters (block 451, FIG. 13) a process Play__List which causes, in the manner discussed above, each file contained in the list to be played. i.e., transmitted to the user. The actual playing of a file is done by a file__player process that is spawned at block 454. However, if the file__player process is already active (block 452), then the program adds the request to the queue of the file player. Returning to FIG. 12, if the play list is empty (block 1004-44), then the program (block 1004-46) waits until a new entry (e.g., a resume or play request) has been stored in the associated request queue. Upon receipt of such notification, the program returns to block 1004-42.

Figure 14:
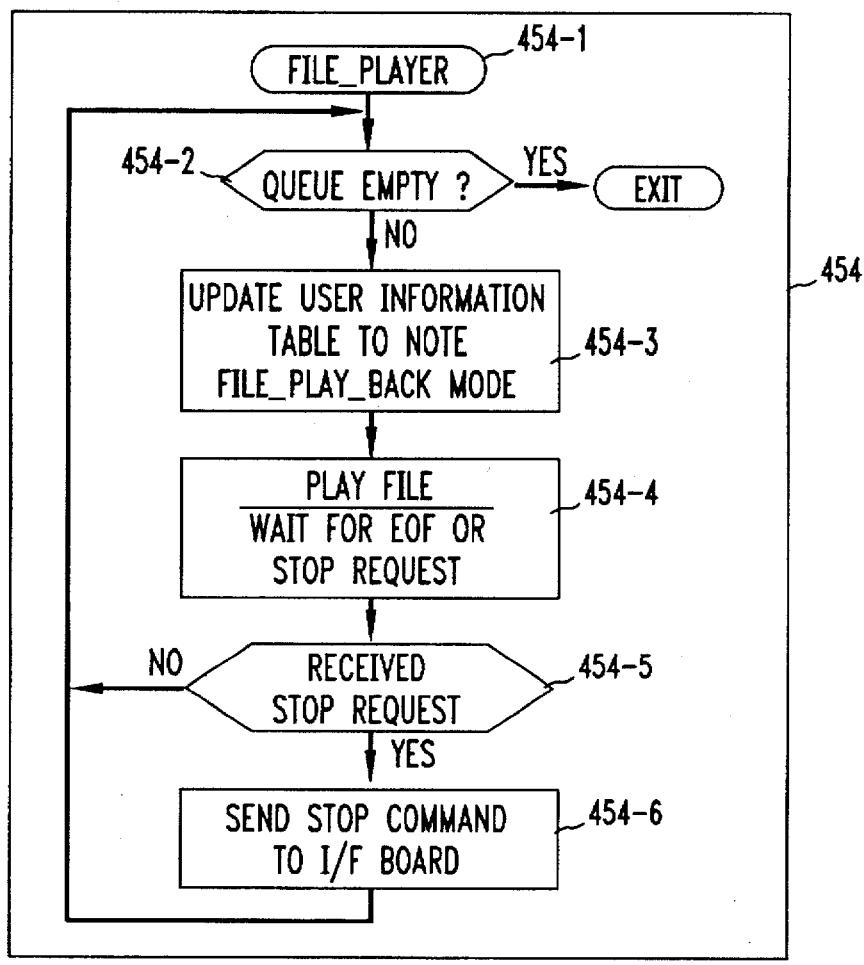

The file__player process that is spawned at block 454 is shown in FIG. 14, and is entered at block 454-1. Specifically, the program (block 454-1) initializes various software variables and then determines (block 454-2) if its associated queue is empty. If it is, then the program exits. Otherwise, the program updates the user's information table to note that the user has requested the playing of a number files (i.e., playback mode). The program then "plays" the file in the manner discussed above, i.e., by unloading the contents of the file and passing it to the I/F board. During such unloading, the program tracks to see if it encounters an End Of File (EOF) indicator or has received a user request to stop playing the file. If the program (block 454-5) encounters a user request (RQST) to stop playing the file, then it (block 454-6) sends a command to the I/F board to terminate the transmission of the file, which results in the termination of the playback of that file. Otherwise, the program returns to block 454-2.

Figure 15:
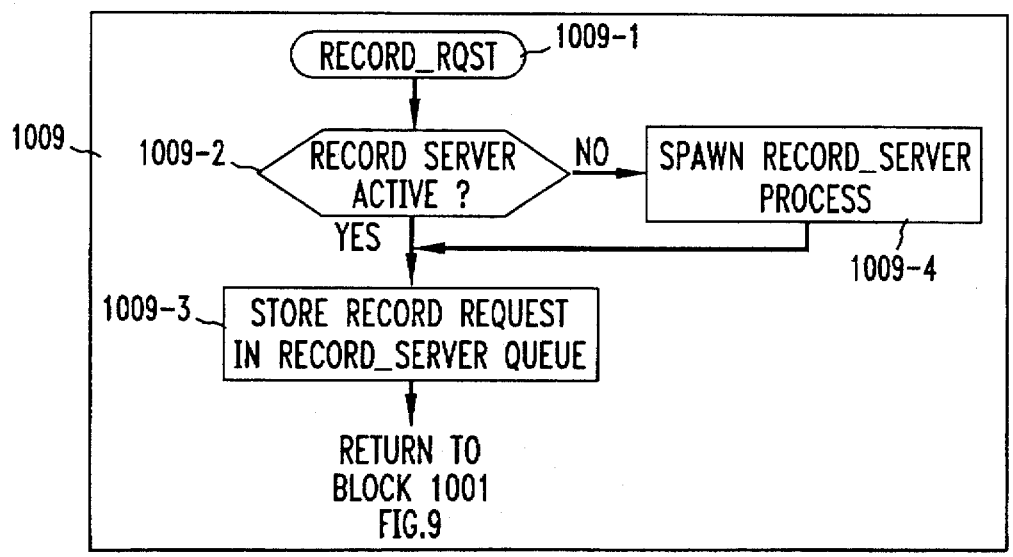

As discussed above, the versatility of multimedia platform 100 provides an application developer with the option of allowing a user to store an analog file, such as music, in disc file 60. To that end, the user may invoke the option by entering a request to store an audio file in disc 60, in which the request is delivered to the B-channel server via the data and audio servers. (The idea of storing a file originated by the user in disc memory 60, is also referred to herein as "recording" the file.) Responsive to receipt of the request, the B-channel server FIG. 9 branches to block 1009 to process the request. An expanded version of block 1009 is illustrated in FIG. 15. When entered (block 1009-1) the record_request routine checks (block 1009-2) to see if a record server has already been spawned to handle the user's request. If that is the case, then the program (block 1009-3) stores the user's request in the queue associated with the record_server process. The program also stores in the queue the identity (location) of the file that will be used to store the user's recording. The program then returns to block 1001. If a server has not been so spawned, then the program (block 1009-4) spawns a copy of the server to handle the request and then proceeds to block 1009-3.

Figure 16:
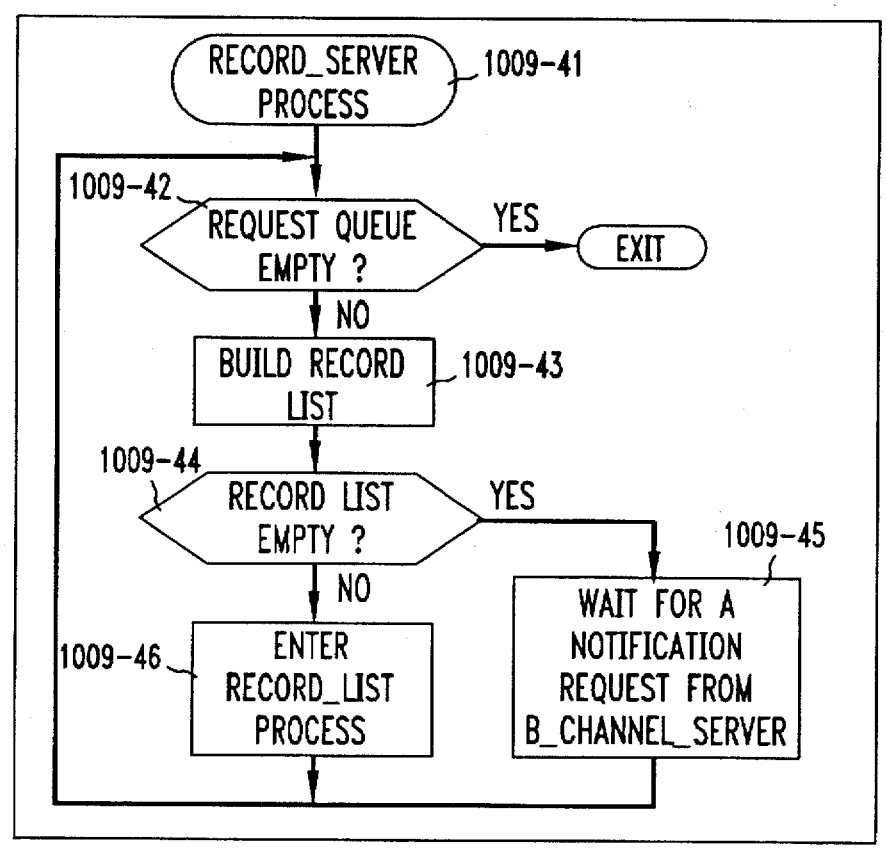
Figure 17:
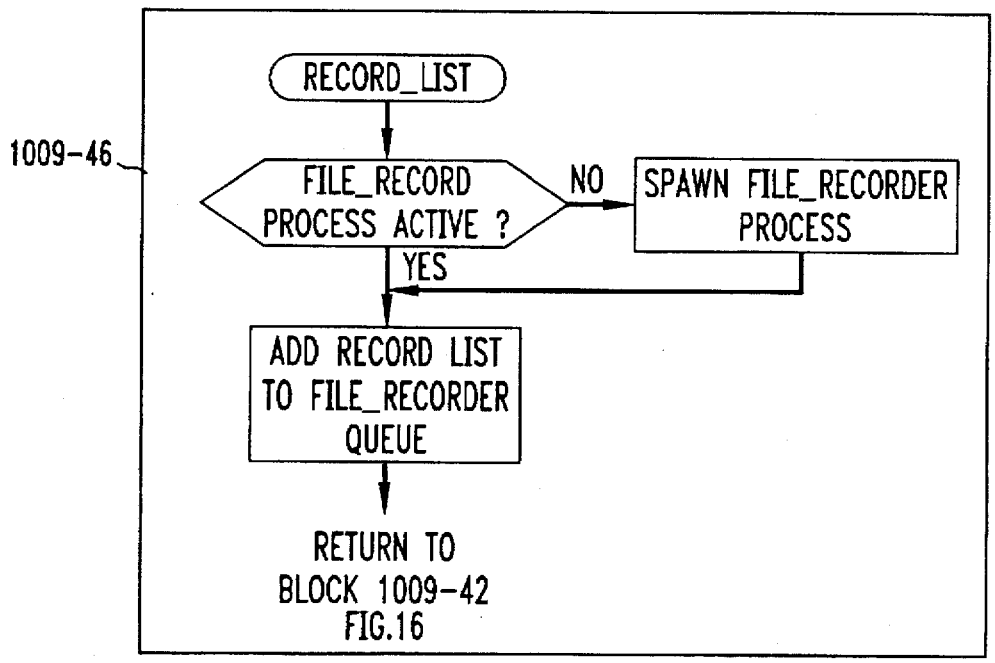

FIG. 16 illustrates in flow chart form the record_server process that is spawned at block 1009-4 of FIG. 15 and that is designed to store analog data characterizing, for example, music, in disc 60 for future use by the user. Specifically, when entered (block 1009-41), the program initializes a number of variables and lists, e.g., a record list, that it uses during its current entry. The program (block 1009-42, 1009-43, 1009-44 and 1009-45) then checks its queue to see if the queue contains one or more record requests of files that are ready to be stored in memory for the user. If the queue is empty, then the program exits. (That is, the program keeps running as long as an entry is contained in its associated queue.) Otherwise, the program (block 1009-43) builds a list of the files that are associated with an indicator and that the program expects to receive via the I/F board for storage in memory 60. More specifically, to "record a file" means that the program will receive the data forming the file from the I/F board associated with the B channel connected to the user and store the data in memory 60 for the user. The I/F board upon receipt of the analog data over the pertinent B-channel converts the analog data into digital form. The record_server (i.e., record_list process discussed below) then stores the digitized data, as discussed above. What is meant by indicator is a request to (a) "record" the file, (b) "pause" the recording of the file (block 1010) (c) "resume" the recording of the file (block 1011) and (d) to stop the recording of the file (block 1012). A request identifying a file but associated with a queued request (indicator) to pause the recording of the file, is not removed from the queue and remains in the queue until a request to resume such recording is received and stored in the associated queue. A request to stop the recording of a file or upon receipt of the last of the data forming the file causes the program to stop such recording. One aspect of the program (block 1009-46) is the entering of a record_list process illustrated in FIG. 17.

Figure 13:
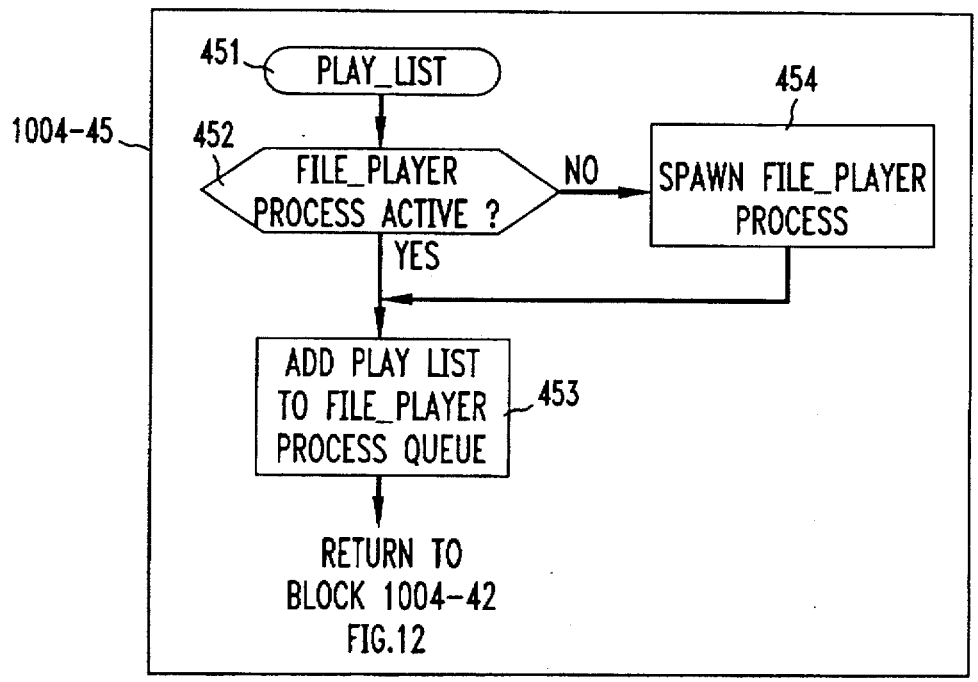

It can be appreciated that the structure of the record_list process is similar to the structure of the play_list process shown in FIG. 13. As such, FIG. 17 will not be discussed herein, since the operation of the record_list process may be readily understood by referring to both FIG. 13 and FIG. 17. However, it suffices to say that the record_list process (a) spawns a file_recorder process if one is not already active and serving the user, (b) adds the record list to the queue of the file_recorder process and then returns to block 1009-42.

Figure 18:
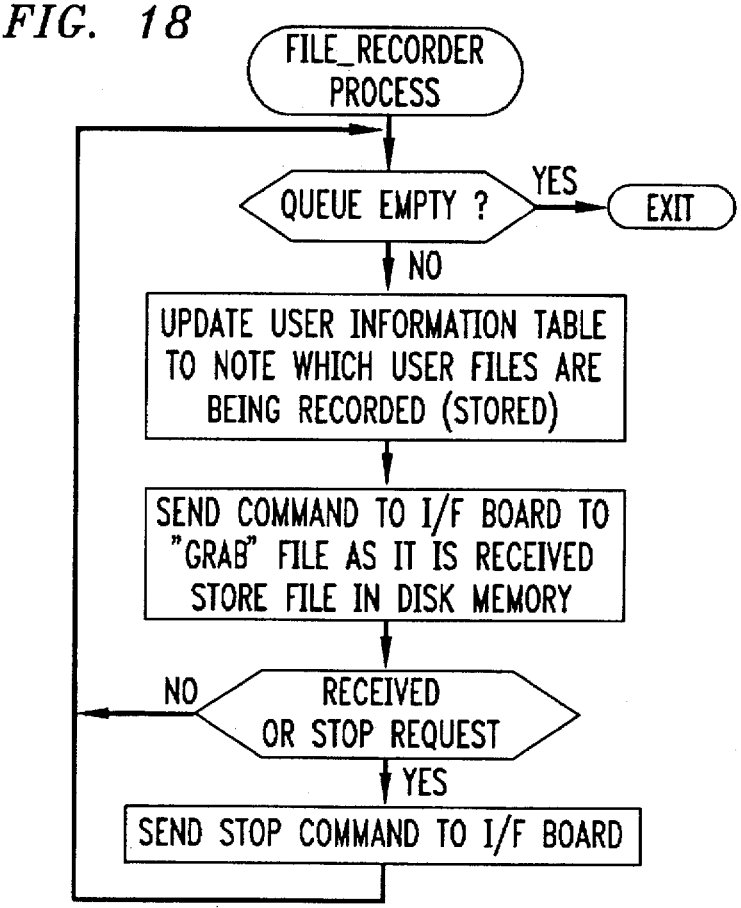

FIG. 18 illustrates in flow chart form the file_recorder process that is spawned by the record_list process. It can be seen from FIG. 18 that the structure of the file_recorder process is somewhat similar to that of the file_player process. Accordingly, FIG. 18 will not be discussed herein, since the functions performed by the various blocks comprising the file_recorder process may be readily ascertained as a result of that similarity and the foregoing discussion of the file_player process.

In the event that the user is "listening" to a file and the playback volume is too high or too low, then, in that event, the user may enter a request to adjust the volume. Responsive to receipt of the request, the B_channel program at block 1013 of FIG. 9 instructs the I/F board associated with the B channel connected to the user to reduce or increase the volume of the information, e.g., music, that is being transmitted over that channel to the user.

Figure 19:
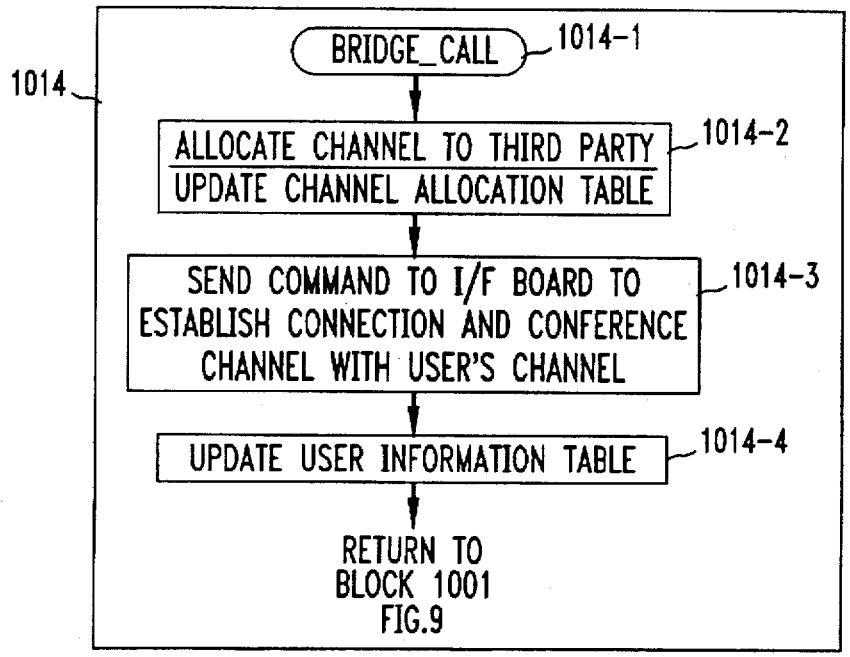

In certain applications, for example, a travelogue application, a user may wish to contact a live operator or agent associated with the application. For example, as a result of viewing a multimedia application relating to a travelogue, a user might want to talk to a travel agent to obtain further details about a vacation "spot" surveyed in the application. If that is case, it is likely that the application will allow the user to enter a request to talk to a travel agent associated with the application. Accordingly, responsive to such a request, the program branches to block 1014 of FIG. 9, which is designed to perform a conferencing function. An expanded version of block 1014 is illustrated in FIG. 19. It is seen that the subroutine or program illustrated in FIG. 19 is somewhat similar to the subroutine illustrated in FIG. 10. However, the bridge_call program operates somewhat differently. Specifically, the program when entered (block 1014-1) obtains (block 1014-2) an idle B-channel and marks the channel as being busy in the channel allocation table. The program (block 1014-3) then sends a command to the interface board to establish a telephone call over the B-channel to the telephone number contained in the request message, which message, in the instant case, was initiated by the data server. The program also includes in the command a request to conference (bridge) the newly established call with the analog B-channel allocated to the user. The program (block 1014-4) then updates the global user information table to track the status of the application and to note the allocation of the B-channel. The program then returns to block 1001.

Figure 20:
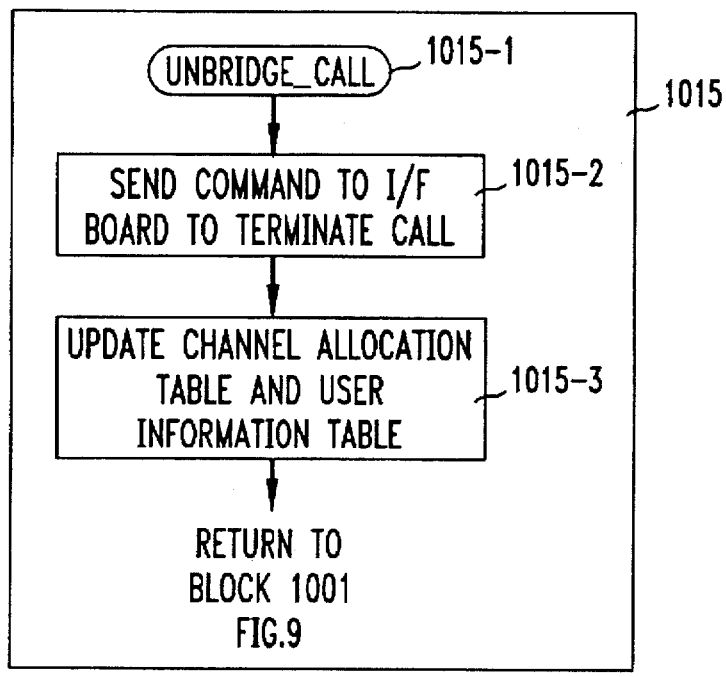

It can be appreciated at this point, that once the I/F board establishes the connection to the third party (e.g., travel agent), then the user and third party may communicate with one another. When the conversation between the user and third party is completed, the user may then enter a request to terminate (unbridge) the third party connection. Such a request, as most of the requests entered by the user, is delivered to the B-channel server by way of the ISDN connection between the user's terminal and the data server. Upon receipt of such a request, the B_channel_server program branches to the unbridge call routine represented by block 1015. An expanded version of block 1015 is illustrated in FIG. 20. More particularly, when the unbridge call routine is entered (block 1015-1) it obtains from the user's information table the identity of the ISDN B-channel that was used to establish a call to the third party. The program (block 1015-2) then sends a command to terminate that B-channel connection to the I/F board, in which the command identifies the B-channel. The program (block 1015-3) then updates the channel allocation table to show (a) that the latter channel is idle and also updates the user information table, (b) that the third party connection has been disconnected and (c) that the B-channel assigned to the user is unbridged. The program then returns to block 1001 of FIG. 9.

Figure 21:
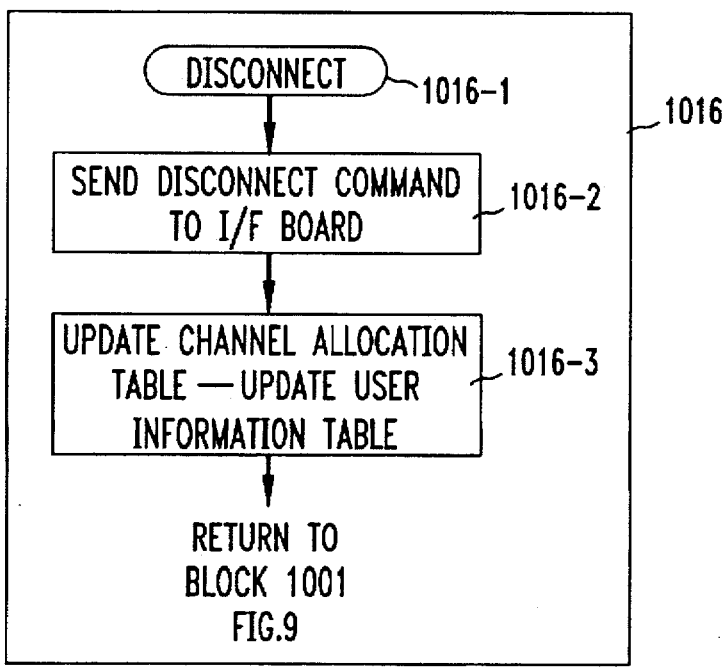

When the analog B-channel that is associated with the user is no longer needed, then the program branches to block 1016, FIG. 9. An expanded version of block 1016 is shown in FIG. 21. When entered (block 1016-1, FIG. 21) the program sends a command (block 1016-2) to the I/F board to disconnect the associated B-channel, in which the command identifies the latter channel. The I/F board, in turn, uses the information in the disconnect command to form a signaling message and sends the signaling message over the associated signaling (D) channel. The program (block 1016-3) then updates the allocation table to show that the channel is idle and updates the user information table accordingly. The program then returns to block 1001.

Figure 23:
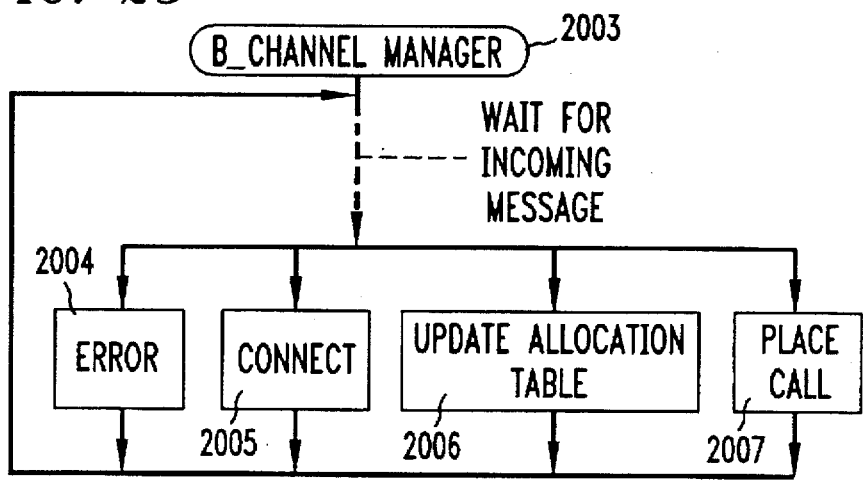
Figure 22:
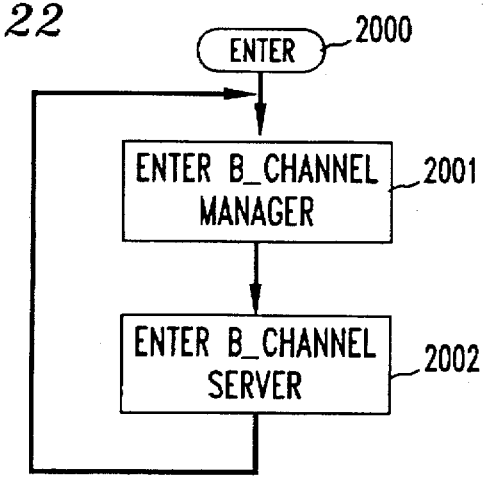

The program which drives the data server is somewhat similar to the program that drives the audio server, as will be seen below. Specifically, when power is applied to the the data server and it is "booted up", a simple program (not shown) is entered which spawns the process shown in FIG. 22 and associates the process with a respective one of the B-channels serving the multimedia platform (FIG. 1). The program of FIG. 22, more particularly, is a simple looping arrangement which first enters a B-channel manager routine (block 2001). When the latter routine completes its task, the program then enters a B-channel server routine (block 2002). An expanded version of block 2001 is shown in FIG. 23. In particular, when entered (block 2003) the program waits for the receipt of a message from the associated B-channel. Upon receipt of a message from the I/F board connected to the associated B-channel, the program branches to one of a number of different routines based on the type of message it received. If a message type is unknown, then the program branches to block 2004 where it passes the error to OS system 50, which stores the received message for processing by a platform administrator. The program then returns to block 2003 to await receipt of new message via its associated B-channel.

Figure 24:
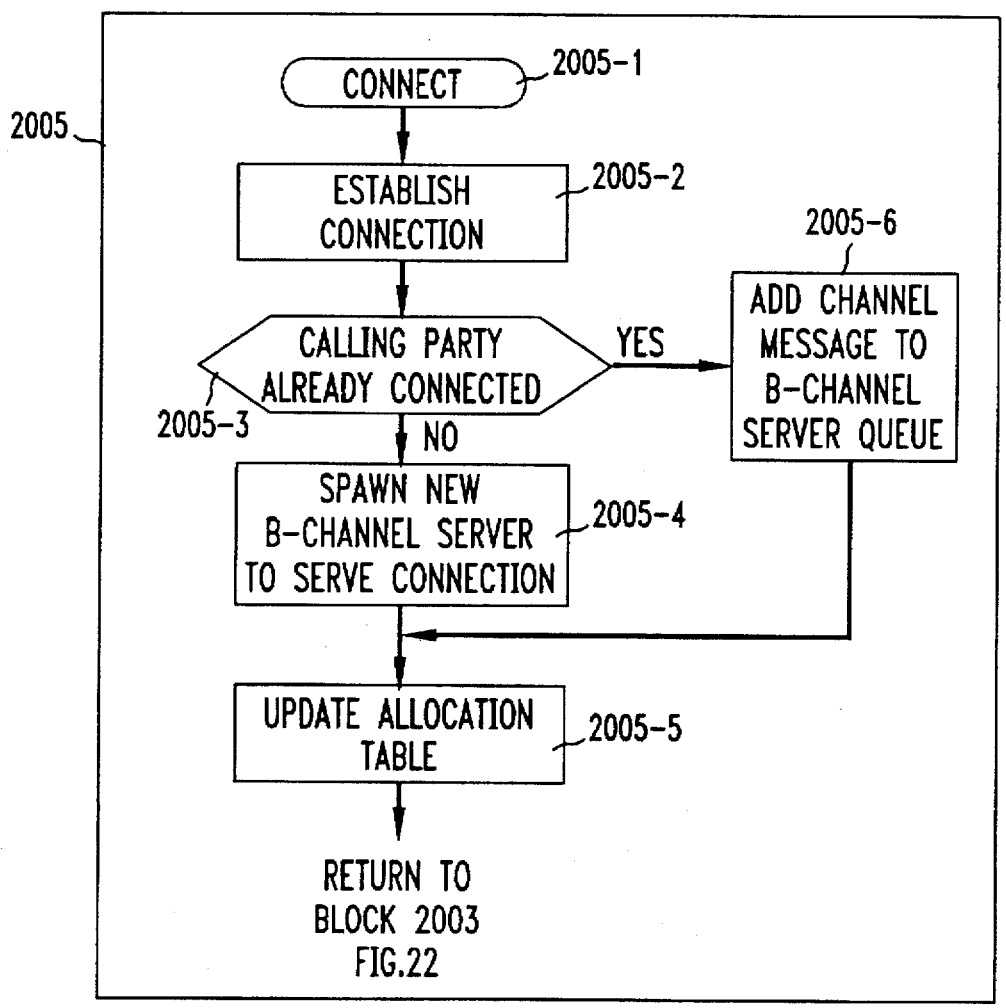

If the received message relates to an incoming call, then the program branches to a connect routine (block 2005). An expanded version of block 2005 is shown in FIG. 24. When entered (block 2005-1), the connect routine sends a message to the I/F board interfacing with the associated B-channel to send an answer supervision signaling message over the D-channel as a way of establishing a connection between the B-channel and the interface board. The routine then checks (block 2005-3) to see if the calling party (e.g., terminal T1, FIG. 1) is already connected to another B-channel. (That is, the received message is a request for a second B-channel.) If that is not the case, then the routine (program) (block 2005-4) spawns a B_channel server to serve the new connection and then updates the B_channel allocation table (block 2005-5) to show that the channel is busy, as discussed above. The routine then returns to block 2003 of FIG. 23. If the calling party is already connected, then the routine (block 2005-6) adds a so-called channel message to the queue of the B-channel server associated with the B-channel from which the message was received at block 2003.

Figure 31:
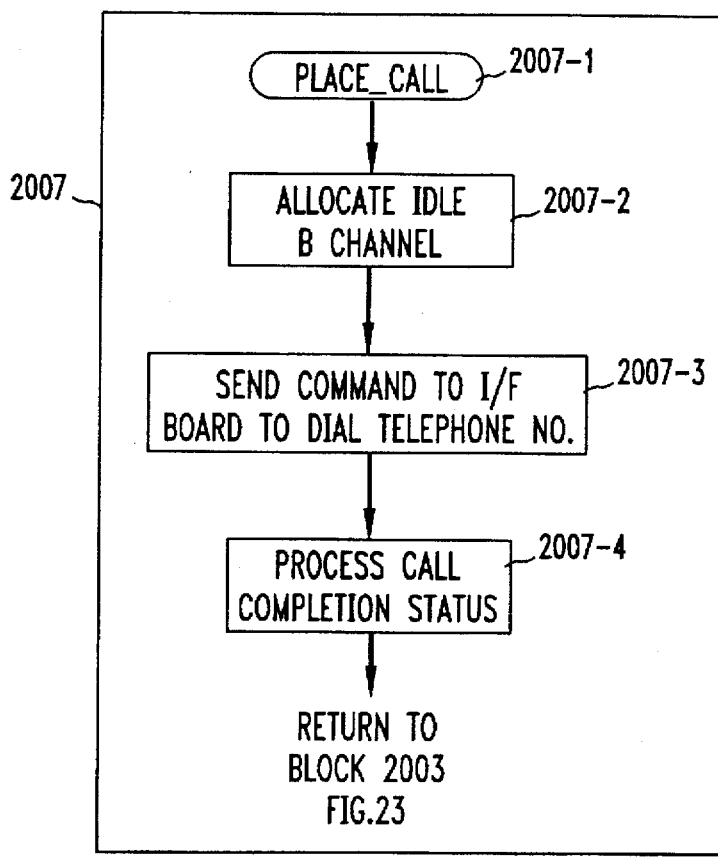

If the incoming message is a disconnect request, the program at block 2003 of FIG. 23 proceeds instead to block 2006 where it updates the B-channel allocation table to show that the B channel is idle. However, if the incoming message is directed to placing a call, then the B_channel manager proceeds to block 2007. An expanded version of block 2007 is shown in FIG. 31. Specifically, when entered the program proceeds from block 2007-1 to block 2007-2 where it allocates an idle B channel to the call identified in the received message. The program (block 2007-3) then directs the I/F board to dial the telephone number contained in the message and then (block 2007-4) processes status information relating to the placing of the call that is returned by the I/F board. At that point, the program returns to block 2003.

Figure 25:
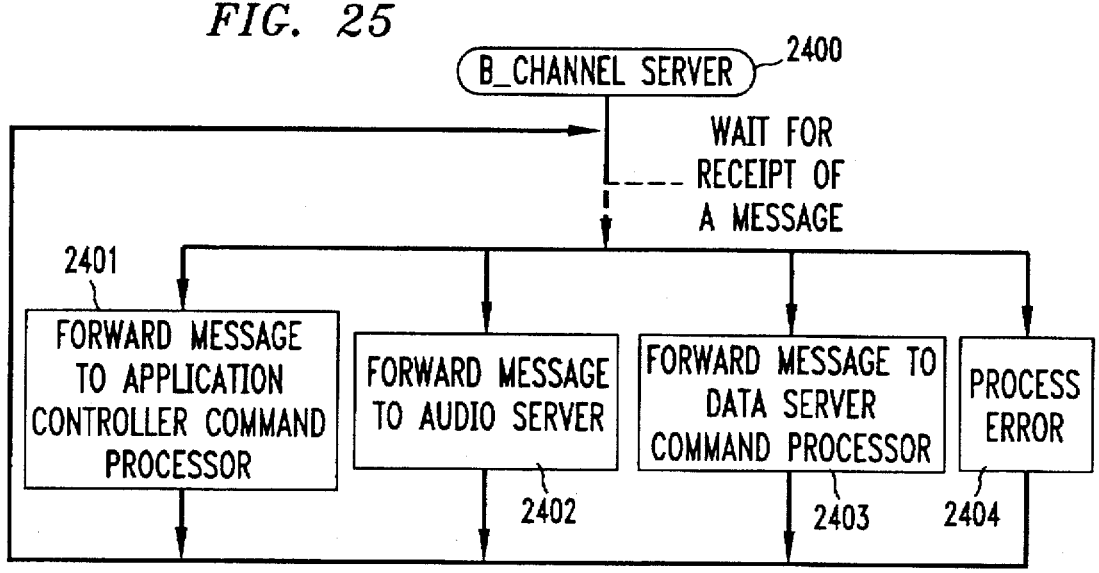

It is noted that when a B_channel server program shown in FIG. 25 is spawned at block 2005-4, then all messages that are received thereafter via the associated B channel are passed to the spawned B_channel server, rather than to the B_channel manager program. Specifically, when so spawned (block 2005-4, FIG. 24) the program, FIG. 25, is entered at block 2400 where it waits for the receipt of a message via the associated B channel. Upon the receipt of a message, the program branches to one of a number of different routines (blocks 2401 through 2404) based on the type of message that is received. If the message is not one of the known types, then the program (block 2404) marks the event as an error and passes the error to OS system 50. The program then returns to block 2400 to await the receipt of the next message. If the message type relates to the application controller program (discussed below), then the program (2401) stores the message in the queue of that program. Similarly, if the message relates to a function associated with the audio server program, then the program (block 2402) stores the message in the queue of that program. If the message relates to a data server function, then the program (block 2403) stores the message in the queue of a so-called data server command processor. FIG. 25 shows that each of the blocks 2401 through 2404 returns to block 2400 after the block has completed its respective task.

An expanded version of the data_server_command program (data_server_cmd) (Block 2403) is shown in flow chart form in FIG. 26. Specifically, when so entered at block 2500, the program initializes a number of local variables. The program then checks its associated queue to see if a message is stored therein. If not, the program exits and is thereafter re-entered after a predetermined amount of time has elapsed, e.g., 25 milliseconds. If a message is in the queue, then the program, like the B_channel process discussed above, branches on the message type to one of a number of different routines represented by blocks 2501 through 2514, respectively. Considering block 2514 first, and then each of the blocks 2501 through 2513, the program branches to block 2514 in the event that the message type is unknown. At block 2514, the program passes the error to OS system 50 and then returns to block 2400.

If the message indicates that a second B channel has been allocated to the user for transmitting data, then the program branches to block 2501 where it updates the user's associated information table to track that transaction and then returns to block 2400. If the message relates to a request for a connection, then the program branches to block 2502 to establish the connection. Specifically, the program first checks the message to determine if it requests a voice connection and passes the message to the analog server if that is case. If that is not the case, then the program checks the aforementioned global information table to determine if two B-channels have already been assigned to the user. If that is the case, the program then checks to see if both channels have been allocated as data channels. If that is the case, then the program cannot respond to the connect message and returns to block 2400. Otherwise, the program assigns (allocates) an idle B channel to the user in the manner discussed above, or changes the status of a B channel already assigned to the user, and then updates the global information channel allocation tables, as the case may be, to show that the assigned channel is in use as a data channel. The program then returns to block 2400.

When the application that the user is running on terminal T1 no longer requires a B channel that is being used in either an audio or data mode, then the message will be a request to disconnect the channel, thereby causing the program to advance to block 2503. At block 2503, the program checks to see if the message is a request to disconnect a B channel that had been used for voice. If that is the case, then the program passes the message to the audio server and then returns to block 2400. Otherwise, the program disconnects the channel by causing it to be placed in an idle mode, as discussed above in connection with the audio server. The program then updates the various aforementioned tables and then returns to block 2400.

Figure 27:
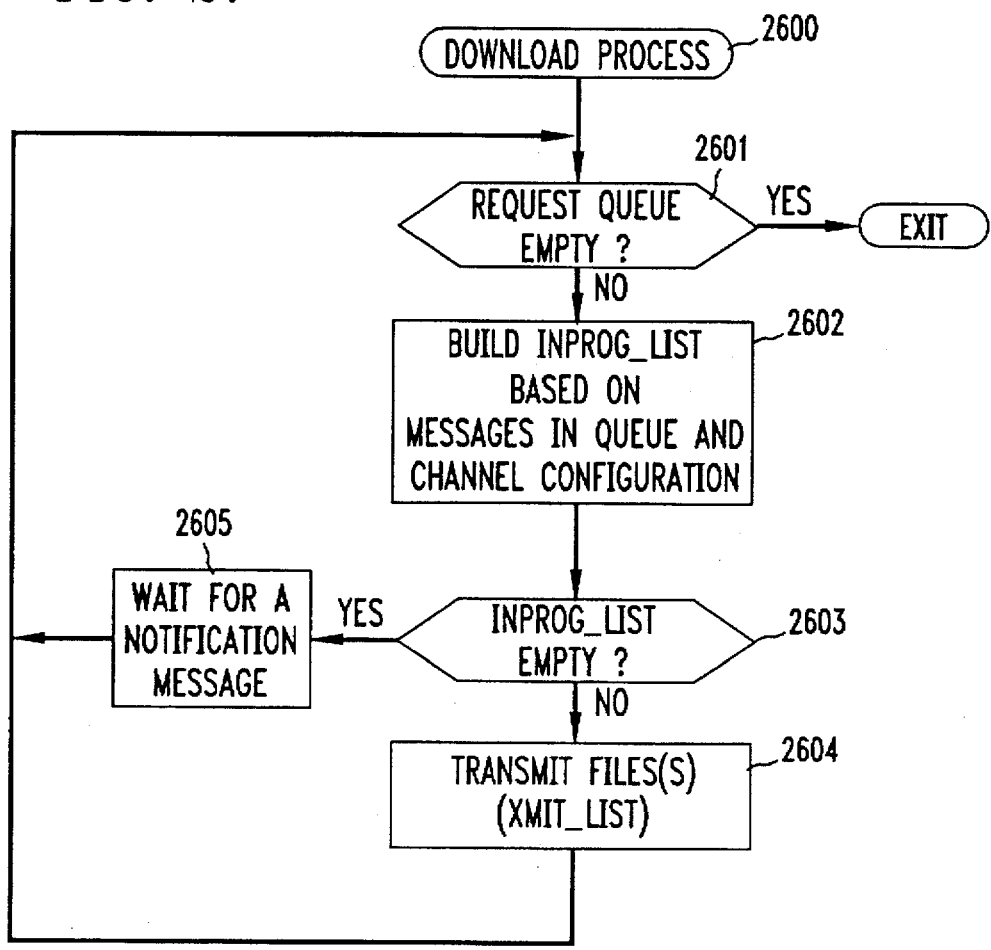

If the message is a request from an application program to download a particular data file to the user's terminal, then the program proceeds to block 2504. At block 2504, the program determines if a "download" process is presently associated with the running of the application selected by the user. If so, then the program adds the request to the queue of that download process and then returns to block 2400. Otherwise, the program spawns a download process to download the data file identified in the received message. The program then stores the received message in the queue of the newly spawned download process and then returns to block 2400. A flow chart of the download process is shown in FIG. 27. In particular, when entered (block 2600) the program initializes various variables that it uses and then determines (block 2601) if its request queue is empty. If it is, then the program exits. Otherwise, the program (block 2602) builds a list (INPROG_LIST) of the names of the files that it will be downloading to the user's terminal. In doing so, the program considers the current configuration of the two B-channels (or one B-channel) connected between the multimedia platform and user's terminal, as discussed below. The program (block 2603) then checks to see if its INPROG_LIST is empty. If the list is not empty, then the program enters a subroutine, XMIT_LIST, to transmit each file identified in the INPROG_LIST. If the program finds that the INPROG_LIST is empty, then it similarly (block 2605) waits for a notification from the B-channel server that a new request has been stored in the queue and returns to block 2601 upon receipt of such notification.

Figure 28:
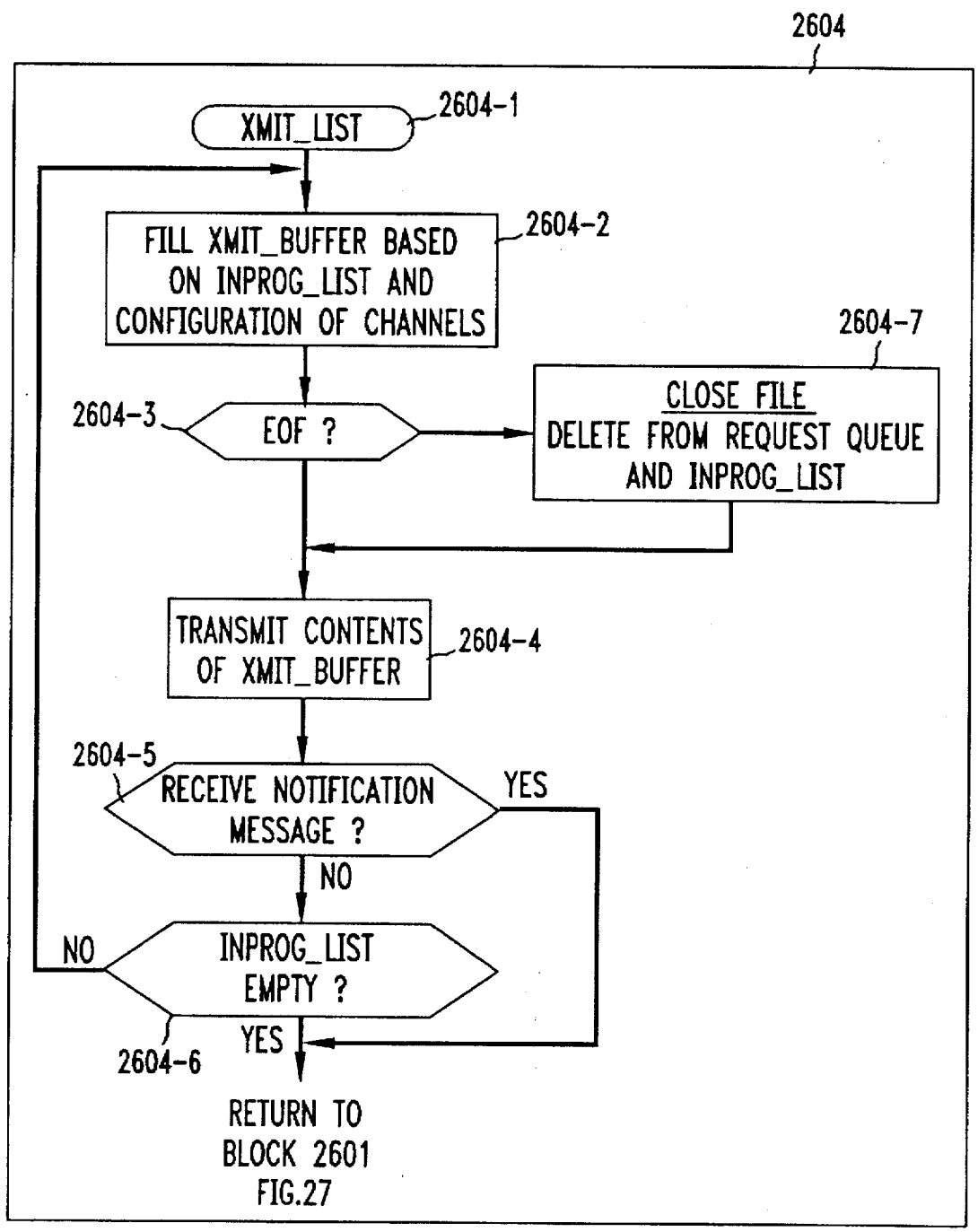

The XMIT_LIST subroutine, or program is shown in FIG. 28. In particular, when entered (block 2604-1) the program removes a file name from the INPROG_LIST and begins to unload the data forming the file from disc memory. In doing so, the program stores the unloaded data in associated transmit buffers (xmit_buffer) associated with the I/F board serving the pertinent B-channel(s). That is, if two B-channels are being used, then the data is stored in the I/F board transmit buffers used for those two channels. In this way the transmission bandwidth is doubled, thereby speeding up the transmission of the data file. If only one B-channel is being used for data, then the unloaded file is stored in the I/F board transmit buffer used for that channel. Also if a number of files are to be downloaded, then the bandwidth of the two channels, or one channel, is allocated to the downloading of those files. For example, if two files are to be downloaded and two B-channels are being used. Then the one file may be allocated to one channel and the other file allocated to the other channel. As another example, one file may be allocated to one and one-half channels. What this means is that part of the file is transmitted over one channel and the other part of the file and another file are multiplexed over the other channel. As another example, if only one B channel is available, then three-fourths of the bandwidth of the channel may be dedicated to one file and the remaining bandwidth may be dedicated to another file. Such sharing of the B-channel bandwidth is calculated by the program and noted in the INPROG_LIST.

Continuing, if during such unloading, the program (block 2604-3) encounters data indicative of the End Of the File (EOF), then the program (block 2604-7) closes the file and deletes the identity of the file from the INPROG_LIST and request queue. The program (block 2604-4) then sends a command to the I/F board directing the board to transmit the contents of the xmit_buffer. The program (block 2604-5) then checks to see if it received a notification message indicating that a new request has been stored in its associated request queue. If so, then the program returns to block 2601 of FIG. 27. Otherwise, the program (block 2604-6) checks to see if the INPROG_LIST is empty and then returns to block 2601 if that is the case. Otherwise, the program returns to block 2604-2.

If the program (FIG. 26) proceeds to block 2505, 2506 or 2507, then it respectively instructs the download process (FIG. 27) to cancel, pause or resume the downloading of a particular file. If the received message pertains to the uploading of a data file from the user's terminal to the multimedia platform, then the program proceeds to block 2508 where it sets up to receive a data file from the user's terminal for storage in the multimedia platform, i.e., disc memory. That is, the program enters an upload process and stores the received message in the queue of the upload process.

Figure 29:
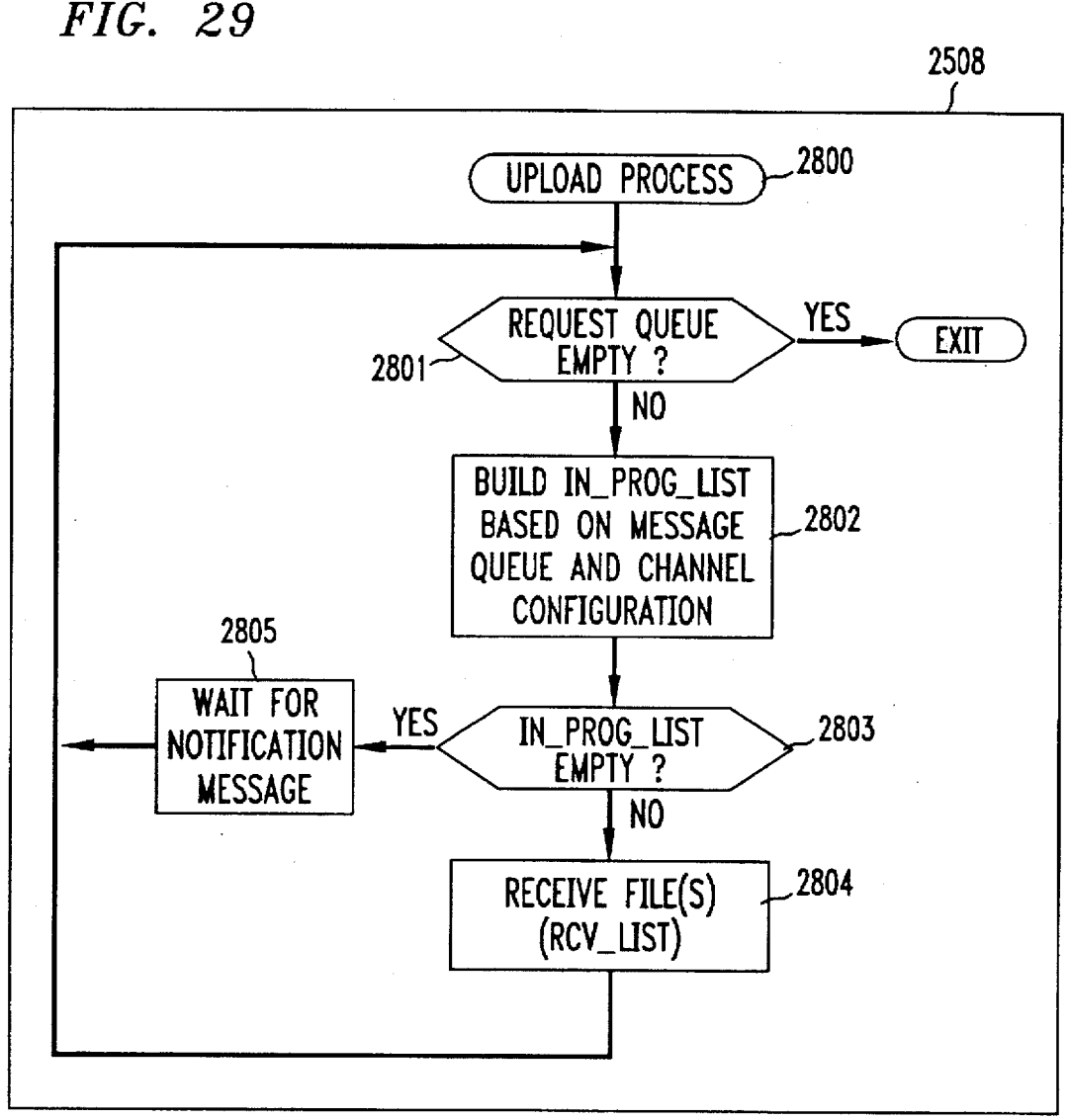

The process that is entered at block 2508 is shown in FIG. 29. It can be appreciated that the upload process is somewhat similar to the download process (FIG. 27). Therefore, FIG. 29 will be explained briefly. Similarly, when the program is entered (block 2800) it initializes various variables that it uses and then exits if its associated request queue is empty. Otherwise, the program constructs (block 2802) a list (INPROG_LIST) of the messages (names of the files that will be received from the user) contained in its associated queue and based on the configuration of the associated B-channels. The program (block 2803) then checks its INPROG_LIST and waits (block 2805) for the receipt of a notification message if the list is empty. Otherwise, the program enters a process (RCV_LIST) for the receiving of a file that will be transmitted by the user's terminal.

Figure 30:
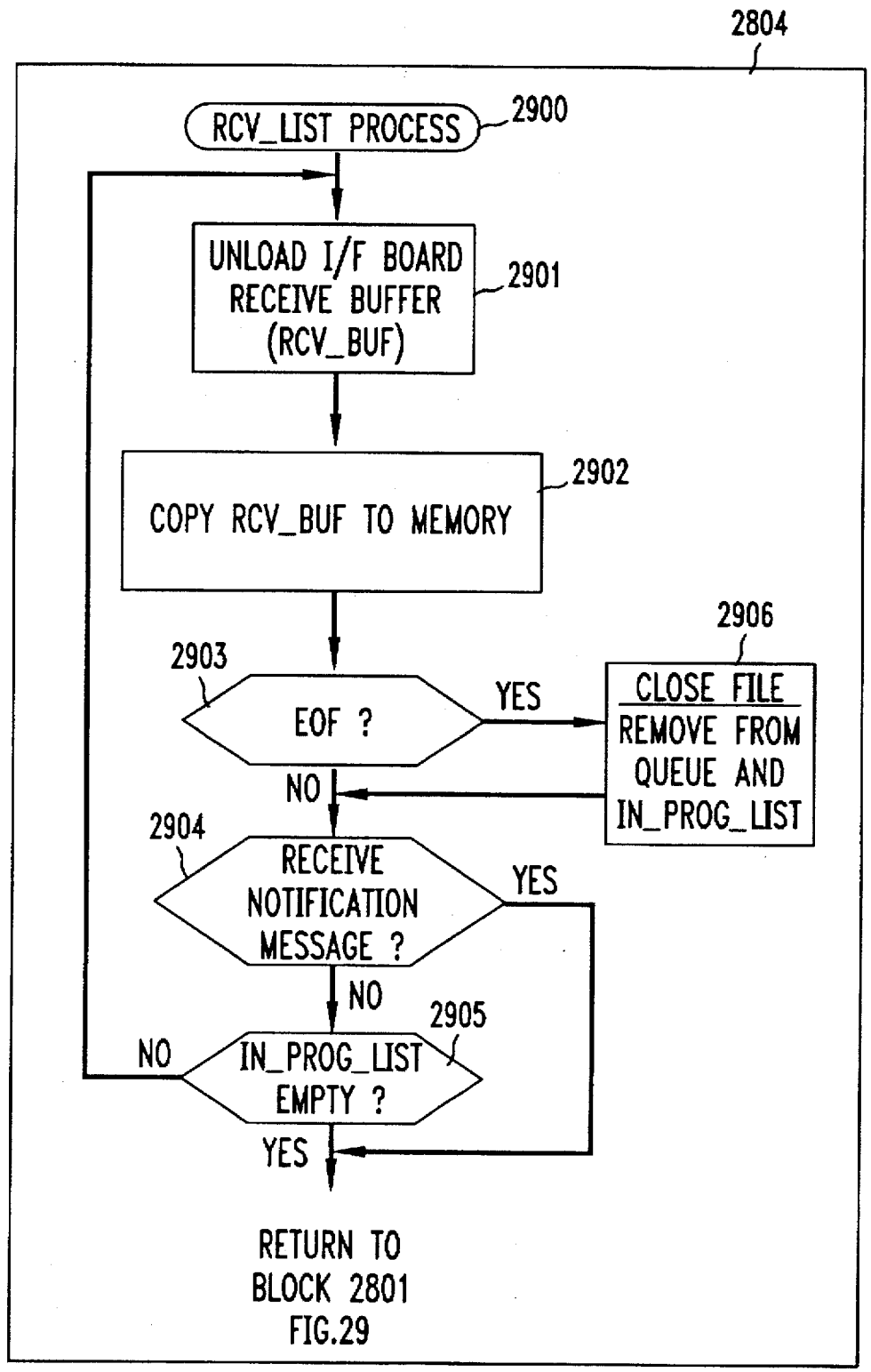

The RCV_LIST process is illustrated in flow chart form in FIG. 30. It is noted that the I/F board is the facility which receives a file from the associated B channel and stores the file in an associated receive buffer (RCV_BUF) as the file is received. When the buffer is full, then the I/F board notifies the RCV_LIST process. The RCV_LIST process, or program, (block 2901) in response thereto empties the buffer. The program (block 2902) then stores the data unloaded from the buffer memory in disc memory 61 (disc). It is noted that such data may be associated with one or more files, in which the channel configuration indicates how the channel bandwidth was shared among the files, if more then one file is being uploaded. If during such unloading and storing the program encounters an EOF (block 2903), then it closes the file (block 2906), and then removes the file name from its associated queue and the INPROG_LIST. The program then returns to block 2801 of FIG. 29. Otherwise, the program (block 2904) checks to see if it was notified that a new upload request message has been stored in its queue and returns to 2801, as shown, if that is the case.

If that is not the case, then the program (block 2905) returns to block 2901 if it finds that the INPROG_LIST is not empty. Otherwise, it returns to block 2801.

If the program, at FIG. 26, proceeds to block 2509, 2510 or 2511, then it respectively instructs the upload process (FIG. 29) to pause, resume or cancel the uploading of a particular file.

Block 2512 of FIG. 26 provides an interface between the data server program and an application program. That is, block 2512 is the means by which the program, responsive to a request received from the application program, notifies the latter whenever a particular download or upload has been completed. Specifically, the program at block 2512, searches the request queues associated with the download and upload processes for the name of a file contained in the request received from the application program. If the program finds the name of the pertinent file in either queue, then it returns a first flag, e.g., a value of false, to the application program to indicate that the data transfer has not been completed (or the transfer had been stopped). Otherwise, the program returns a second flag, e.g., a value of true, to the application program.

The data server program of FIG. 26, proceeds to block 2513 when the type of message is a request to reconfigure two B_channels that have been associated with the user. That is, the request is typically from an application program to reconfigure the two B_channels, e.g., to drop one of the B_channels. Specifically, the program at block 2513 updates the user information table and channel allocation table to conform with the reconfiguration request. The program then notifies the download and upload processes that a channel reconfiguration has occurred and halts the running of the download and upload processes during such updating.

Figure 32:
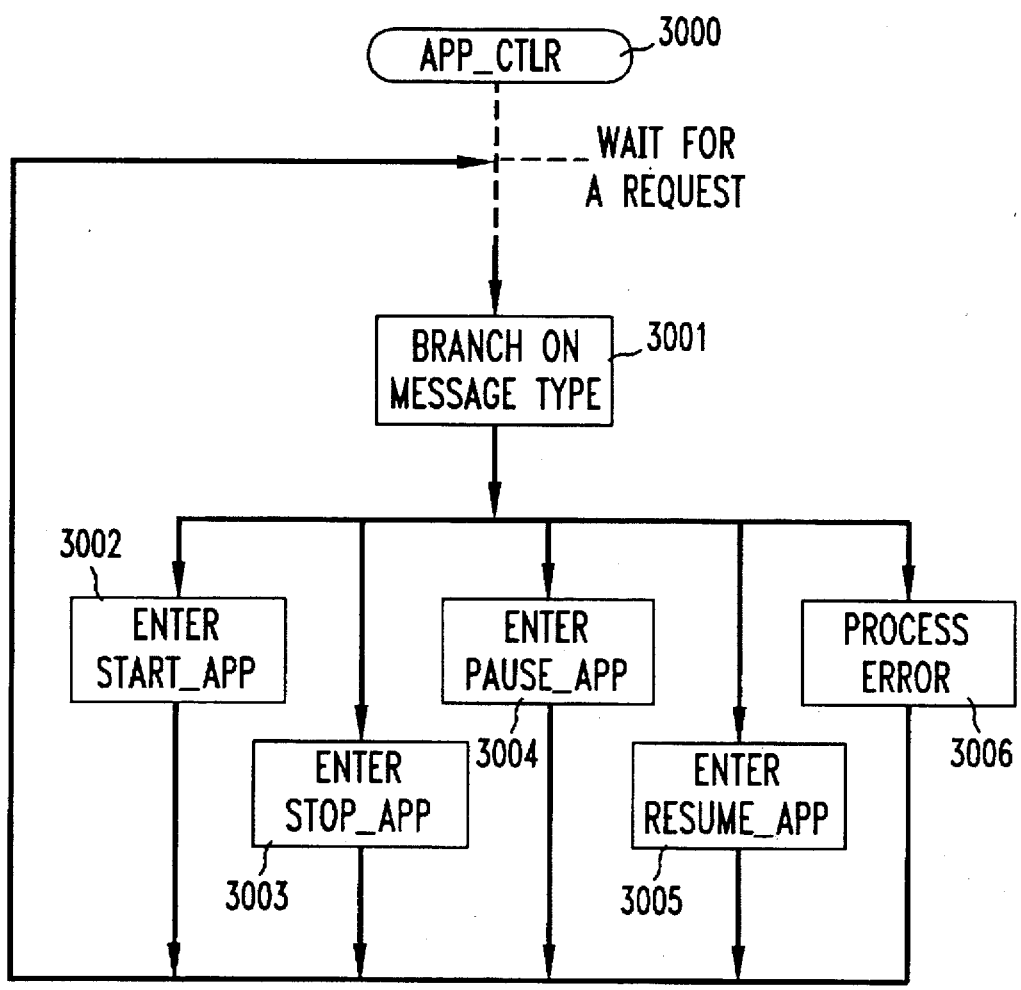
FIG. 32 illustrates in flow chart form the program which implements the principles of the invention in the application controller of FIG. 1.

The entry of an application in response to a user selection is under the control of an application controller program which resides on the application controller. More particularly, when the application controller is booted up the application controller program (APP_CTLR) FIG. 32 is entered at block 3000 where it waits for receipt of a request message identifying a user's selection of a particular application, or the stopping, pausing or resuming of an already entered application. More particularly, upon receipt of a request, the program (block 3001) branches to one of a number of different subroutines (blocks 3002 through 3006) based on the type of message that is received. If the message type is unknown, then the program (block 3006) considers the message to be an error and passes it to OS system 50 for processing. The program then returns to block 3000 to await receipt of a next application-related request.

If the request is for the starting of a particular application, then the program proceeds to block 3002, where it invokes that application. In addition, the program passes the configuration of the B channels associated with the user to the invoked application program. The controller program then updates the user information table to identify the selected application. The program then returns to block 3000. If the request is directed to the stopping of an invoked application program, then the controller (block 3003) sends a message to that effect to the application program and updates the user information table accordingly. Similarly, the controller program, responsive to a request to pause (or resume), sends (block 3004 or 3005) a message to that effect to the application. The application, in turn, responds to the receipt of the request (sent via block 3003, 3004 or 3005) by performing the requested action.

APPENDIX A

The following directs (requests) the audio server to play a voice file int play_audio_file(int handle, char *ap, char *tune)

The handle is the value returned by the connect function when the connection was established, as will be further discussed below; ap is a pointer to a string specifying the application name; tune is a pointer to a string specifying the audio file name. over a previously established B-channel voice connection.

The following directs the audio server to pause the playback of a voice file at its current point.

int pause_audio_playback(int handle)

The following directs the audio server to resume the playback of a paused voice file.

int resume_audio_playback(int handle)

The following directs the audio server to skip to the start of the next voice file in the playback list and start playing it.

int skip_audio_playback(int handle)

The following directs the audio server to adjust the volume of the audio transmitted over a B-channel voice connection. The volume may be increased or decreased.

int adjust_volume(int handle)

The following directs the audio server to interrupt the playback of a voice file being played over a B-channel voice connection.

int stop_audio_playback(int handle)

The following directs the audio server to bridge another voice connection onto a B-channel voice connection.

int bridge_call(int handle)

The following directs the audio server to remove a voice connection that had previously been bridged onto the call.

int unbridge_call(int handle)

The following directs the audio server to record audio being received over a voice connection into a voice file.

record_audio(int handle)

The following directs the audio server to pause the recording of a voice file at its current point.

int pause_audio_record(int handle)

The following directs the audio server to resume the recording of a paused voice file.

int resume_audio_record(int handle)

The following directs the audio server to stop the recording of a voice file.

int stop_audio_record(int handle)

For the above commands "handle" is the value returned by the connect function when the connection was established and returns 0 if successful, otherwise a −1.

We claim:

1. A subscriber terminal for use in a multimedia communication network that has a multimedia system connected to said subscriber terminal, said multimedia communication network coordinating a transfer of multimedia scenes between said multimedia system and said subscriber terminal, said multimedia scenes including a combination of audio, data and executable program, said audio, data and executable program partitioned into each of said multimedia scenes as to be transferable, said partitioned executable program being executable and using said partitioned audio and data, said subscriber terminal comprising:

means for sending to said multimedia system a first message requesting a first multimedia scene in response to a subscriber selection;

means for concurrently sending to said multimedia system a second message requesting a second multimedia scene;

means for receiving said first and second multimedia scene;

means for executing said executable program included in said first multimedia scene upon a receipt of said first multimedia scene; and means for receiving said second multimedia scene in a background as said executable program is executed.

2. A subscriber terminal of claim 1, wherein said executable application runs said audio and displays said data including an image, graphic, animation, hypertext and hypermedia.

3. A subscriber terminal of claim 1, wherein said multimedia communication network manages a plurality of communication channels between said multimedia system and said subscriber terminal.

4. A subscriber terminal of claim 3, wherein said multimedia communication network transfer said audio over one of said communication channels while transferring said audio over another of said communication channels.

5. A subscriber terminal of claim 3, wherein said multimedia communication network allows telephony functions between said multimedia system and said subscriber terminal over one of said communication channels while transferring said multimedia scenes over another of said communication channels.

6. A subscriber terminal of claim 3, wherein said multimedia communication network selects said second multimedia scene based on availability of said communication channels.

7. A subscriber terminal of claim 3, wherein said second multimedia message is formed based on a subscriber selection probability.

8. A subscriber terminal of claim 1, further comprising means for collecting said multimedia scenes and sending said multimedia scenes to said multimedia system.

9. A multimedia system for use in a communication network, said multimedia system connected to at least one subscriber terminal, said multimedia communication network coordinating a transfer of multimedia scenes between said multimedia system and said at least one subscriber terminal, said multimedia scenes including a combination of audio, data and executable program, said audio, data and executable program partitioned into each of said multimedia scenes as to be transferable, said partitioned executable program being executable and using said partitioned audio and data, said multimedia system comprising:

means for storing said multimedia scenes;

means for receiving from said subscriber terminal messages requesting said multimedia scenes;

means for retrieving from said storage means said executable program and for retrieving said audio and data necessary for executing said executable program at said subscriber terminal; and means for sending said multimedia scenes to said subscriber terminal.

10. A multimedia system in claim 9, wherein said multimedia communication network manages a plurality of communication channels between said multimedia system and said at least one subscriber terminal.

11. A multimedia system of claim 10, wherein said multimedia system assigns one of said communication channels to transfer said audio and assigns another of said communication channels to said data and executable program.

12. A multimedia system of claim 10, further comprising means for playing said audio over said communication channel.

13. A multimedia system of claim 10, further comprising:

said receiving means for receiving said multimedia scenes from said subscriber; and said storage means for storing said multimedia scenes from said subscriber.

14. A communication network having a multimedia system connected to at least one subscriber terminal and coordinating a transfer of multimedia scenes between said multimedia system and said at least one subscriber terminal, said multimedia scenes including audio, data and executable program, said multimedia scenes including a combination of audio, data and executable program, said audio, data and executable program partitioned into each of said multimedia scenes as to be transferable, said partitioned executable program being executable and using said partitioned audio and data, said multimedia communication network comprising:

at least one database connected to said multimedia system for storing said multimedia scenes;

means located at said at least one subscriber terminal for sending to said multimedia system messages requesting multimedia scene in response to subscriber selections;

means located at said multimedia system for receiving from said subscriber terminal said messages, for retrieving from said database said multimedia scenes including said executable program and said audio and data necessary for executing said executable program and for sending said multimedia scenes to said subscriber terminal; and means located at said at least one subscriber terminal for receiving said multimedia scenes, for executing said executable program, means for receiving another multimedia scene in a background while executing said executable program.

15. A subscriber terminal for use in a multimedia communication network having a multimedia system connected to said subscriber terminal, said multimedia communication network coordinating a transfer of multimedia scenes between said multimedia system and said subscriber terminal, said multimedia scenes including a combination of audio, data and executable program, said audio, data and executable program partitioned into each of said multimedia scenes as to be transferable, said partitioned executable program being executable and using said partitioned audio and data, said subscriber terminal comprising:

an audio speaker;

a display device; and a processor connected to said audio speaker and display device for formulating a first message requesting a first multimedia scene, for concurrently formulating a second message requesting a second multimedia scene, for sending said first and second messages to said multimedia system, for receiving said first multimedia scene, for executing said executable program, for playing said audio on said audio speaker, for displaying said data on said display device and for receiving said second multimedia scene in a background while executing executable program.

16. A subscriber terminal of claim 15, further comprising:
a subscriber input device connected to said processor; and
said processor for formulating said messages in response to a subscriber input.

17. A subscriber terminal of claim 15, further comprising:
an audio input device to collect audio; and
said processor for formulating a third message requesting said multimedia system to store said audio and for sending said audio with said third message to said multimedia system.

18. A multimedia system for use in a multimedia communication network having at least one server connected to at least one subscriber terminal, said multimedia communication network coordinating a transfer of multimedia scenes between said at least one server and said at least one subscriber terminal, said multimedia scenes including a combination of audio, data and executable program, said audio, data and executable program partitioned into each of said multimedia scenes as to be transferable, said partitioned executable program being executable and using said partitioned audio and data, said multimedia system comprising:

at least one database for storing said multimedia scenes; and said at least one server for receiving from said at least one subscriber terminal messages requesting said multimedia scenes, for retrieving from said at least one database said executable program, for retrieving said audio and data necessary for said executable program and for sending said multimedia scenes to said at least one subscriber terminal.

19. A multimedia system of claim 18, wherein said at least one database includes a first database for storing said audio and a second database for storing said executable program and said data including an image, graphic, animation, hypertext and hypermedia.

20. A multimedia system of claim 19, wherein said at least one server comprises:

a data server for accessing said first database and for retrieving said image, graphic, animation, hypertext and hyper media;

an application controller for accessing said first database and said second database, for retrieving said application and for retrieving said audio and said data necessary for said executable program; and an audio server for accessing said second database and for retrieving said audio and for playing said audio over said communication network.

21. A multimedia communication network having at least one server connected to at least one subscriber terminal and coordinating a transfer of multimedia scenes between said at least one server and said at least one subscriber terminal, said multimedia scenes including a combination of audio, data and executable program, said audio, data and executable program partitioned into each of said multimedia scenes as to be transferable, said partitioned executable program being executable and using said partitioned audio and data, said multimedia communication network comprising:

a subscriber processor located at said at least one subscriber terminal for formulating a first message requesting a first multimedia scene in response to a subscriber selection, for concurrently formulating a second message requesting a second multimedia scene and for sending said first and second messages to said at least one server;

at least one database located at said multimedia system for storing said multimedia scenes;

said at least one server for receiving from said subscriber terminal said first and second messages requesting said multimedia scenes, for retrieving from said at least one database said first and second multimedia scenes and for sending said first and second multimedia scenes to said subscriber terminal; and said subscriber processor for receiving said first multimedia scene, displaying said first multimedia scene and for receiving said second multimedia scene while displaying said first multimedia scene.

22. A multimedia communication network of claim 21, further comprising an application provider for providing said executable program to said multimedia system.

23. A multimedia communication network of claim 22, wherein said multimedia system comprising an application development platform for conducting a test on said application program and for correcting an error detected during said test.

* * * * *